(12) United States Patent  
Walton

(10) Patent No.: US 11,019,910 B2  
(45) Date of Patent: Jun. 1, 2021

(54) PERSPECTIVE ADJUSTABLE VIEWING APPARATUS WITH BASE SUCTION DEVICE FOR LOCKING TO SURFACES

(71) Applicant: bLkPiNa LLC, Los Angeles, CA (US)

(72) Inventor: Dorthea Walton, Los Angeles, CA (US)

(73) Assignee: bLkPiNa, LLC, Los Angeles, CA (US)

( * ) Notice: Subject to any disclaimer, the term of this patent is extended or adjusted under 35 U.S.C. 154(b) by 70 days.

(21) Appl. No.: 16/256,970

(22) Filed: Jan. 24, 2019

(65) Prior Publication Data

US 2020/0237078 A1 Jul. 30, 2020

(51) Int. Cl.
| | |
|---|---|
| G02B 7/182 | (2021.01) |
| A45D 42/14 | (2006.01) |
| F16M 13/02 | (2006.01) |
| F16B 47/00 | (2006.01) |

(52) U.S. Cl.
CPC ............ A45D 42/14 (2013.01); F16B 47/006 (2013.01); F16M 13/022 (2013.01); G02B 7/182 (2013.01); *F16M 2200/06* (2013.01); *F16M 2200/08* (2013.01)

(58) Field of Classification Search
CPC ........ G02B 7/182; A45D 42/14; F16B 47/006
USPC ................... 359/872, 881; 248/467
See application file for complete search history.

(56) References Cited

U.S. PATENT DOCUMENTS

| 207,579 | A |   | 8/1878  | Wilcox |
| 763,380 | A |   | 6/1904  | Eble |
| 952,495 | A | * | 3/1910  | Austin |
| 1,063,220 | A |   | 6/1913  | Seamon |
| 2,915,944 | A |   | 12/1959 | Butts |
| 4,856,888 | A |   | 8/1989  | Wahl |
| 5,566,030 | A | * | 10/1996 | Yue ........................ A45D 42/00 248/467 |
| 6,607,054 | B1 | * | 8/2003 | Lindfield ............... B65G 47/91 182/113 |
| 8,066,238 | B1 | * | 11/2011 | Kuo ...................... F16B 47/006 248/205.7 |

(Continued)

FOREIGN PATENT DOCUMENTS

| GB | 667679 A | 3/1952 |
| JP | 3108556 U | 4/2005 |

(Continued)

OTHER PUBLICATIONS

Peeka-bu Gooseneck Intimate Grooming Mirror in White Source: https://www.homedepot.com/p/Zadro-Peeka-Bu-Gooseneck-Intimate-Grooming-Mirror-in-White-PEEK01/203053398 Date Accessed: Nov. 21, 2017.

*Primary Examiner* — Ricky D Shafer
(74) *Attorney, Agent, or Firm* — Peter L. Holmes; Leech Tishman Fuscaldo & Lampl, Inc.

(57) ABSTRACT

A viewing apparatus that is securable (lockable) to surfaces includes a mirror, a base, and an interconnection assembly between the base and the mirror. The base includes a suction device for selectively locking or unlocking the viewing apparatus to/from a mounting surface. The suction device utilizes a lifter and an internal coupler that drives the lifter, responsive to user operation of a lock/unlock selector, to reposition a flexible diaphragm increasing or decreasing the volume of a space between an underside surface of the suction device and the mounting surface depending upon a direction of rotation of the selector.

20 Claims, 17 Drawing Sheets

(56) References Cited

U.S. PATENT DOCUMENTS

| | | | | |
|---|---|---|---|---|
| 8,087,625 | B2* | 1/2012 | Chang | F16M 13/022 |
| | | | | 248/205.5 |
| 9,732,785 | B2* | 8/2017 | Kobayashi | F16B 47/006 |
| 10,649,492 | B2* | 5/2020 | Peters | F16M 11/14 |
| 10,731,391 | B2* | 8/2020 | Lucari | E05B 51/02 |
| 2004/0233556 | A1 | 11/2004 | LaViola | |
| 2007/0090234 | A1* | 4/2007 | Liao | F16M 11/2014 |
| | | | | 248/127 |
| 2007/0210225 | A1* | 9/2007 | Carnevali | F16B 47/00 |
| | | | | 248/205.8 |
| 2008/0217826 | A1* | 9/2008 | Kim | B60R 11/0258 |
| | | | | 269/21 |
| 2009/0050758 | A1* | 2/2009 | Carnevali | F16B 47/00 |
| | | | | 248/205.8 |
| 2016/0051034 | A1 | 2/2016 | Nikolov et al. | |
| 2020/0064590 | A1* | 2/2020 | Boehm | A45D 42/16 |

FOREIGN PATENT DOCUMENTS

| | | |
|---|---|---|
| KR | 200475124 Y1 | 11/2014 |
| TW | M523342 U | 6/2016 |

\* cited by examiner

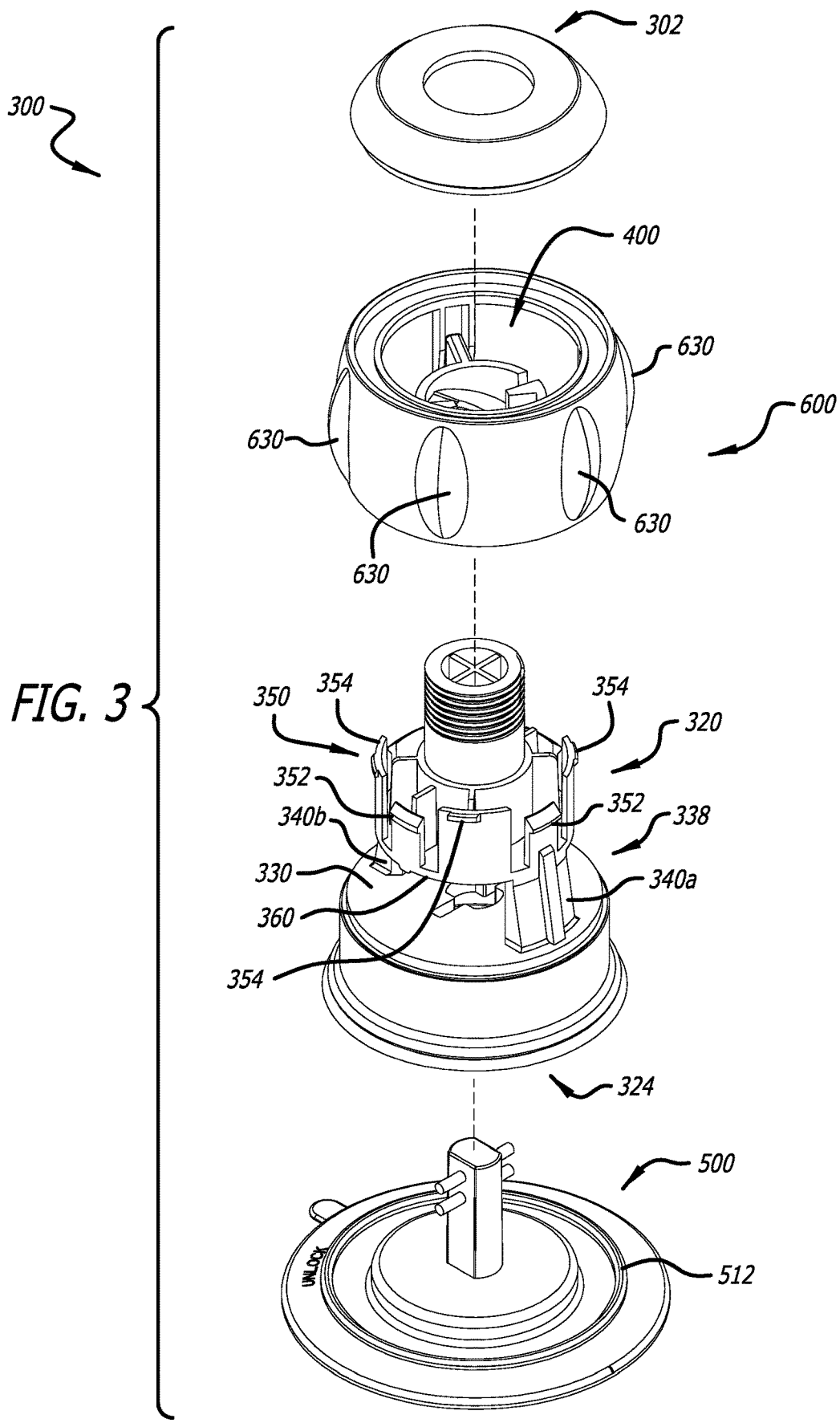

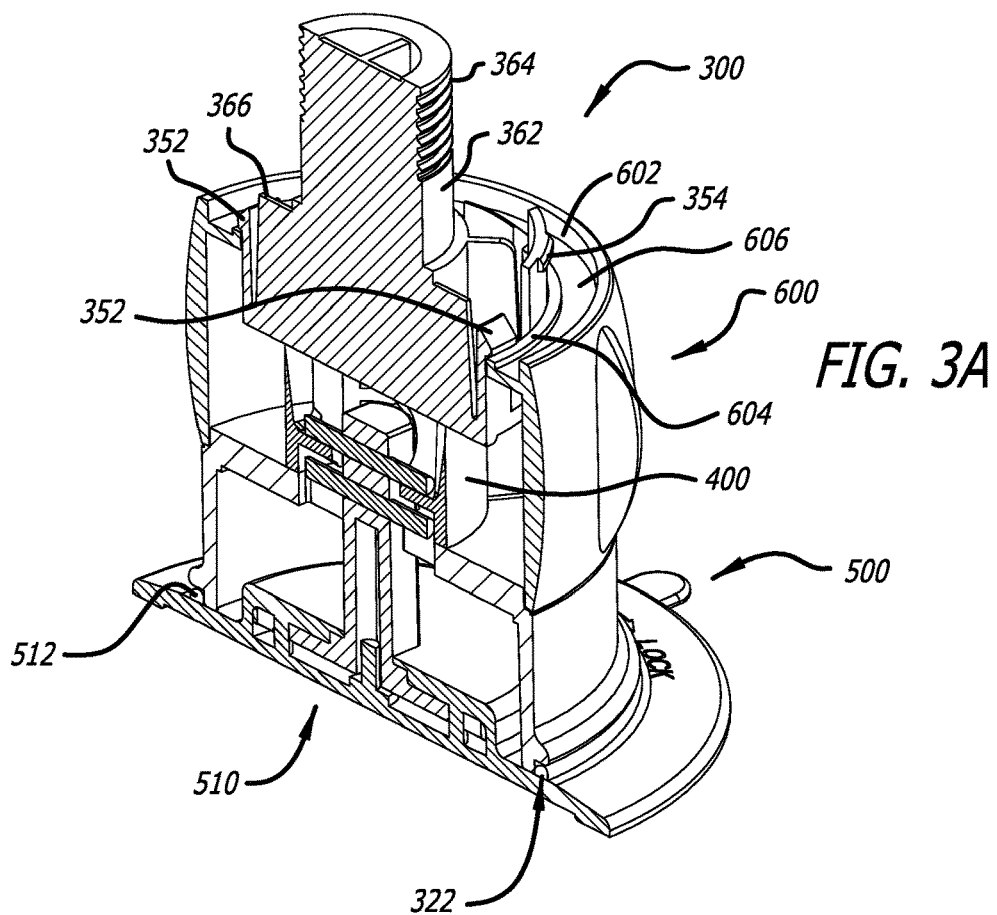
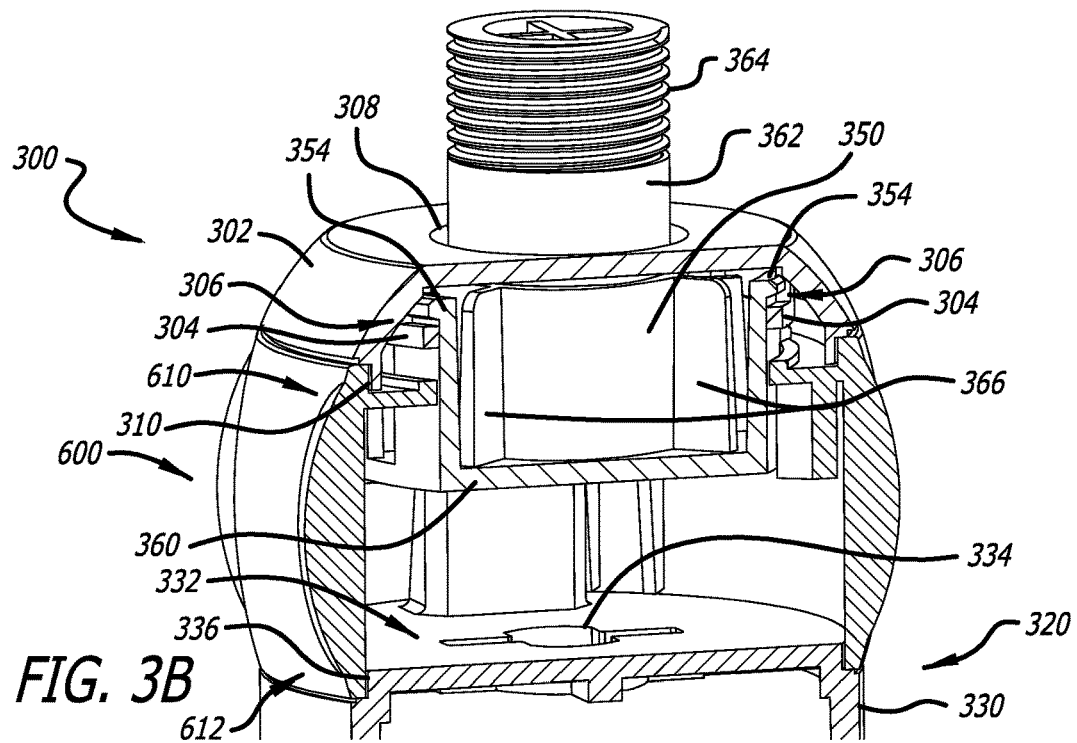

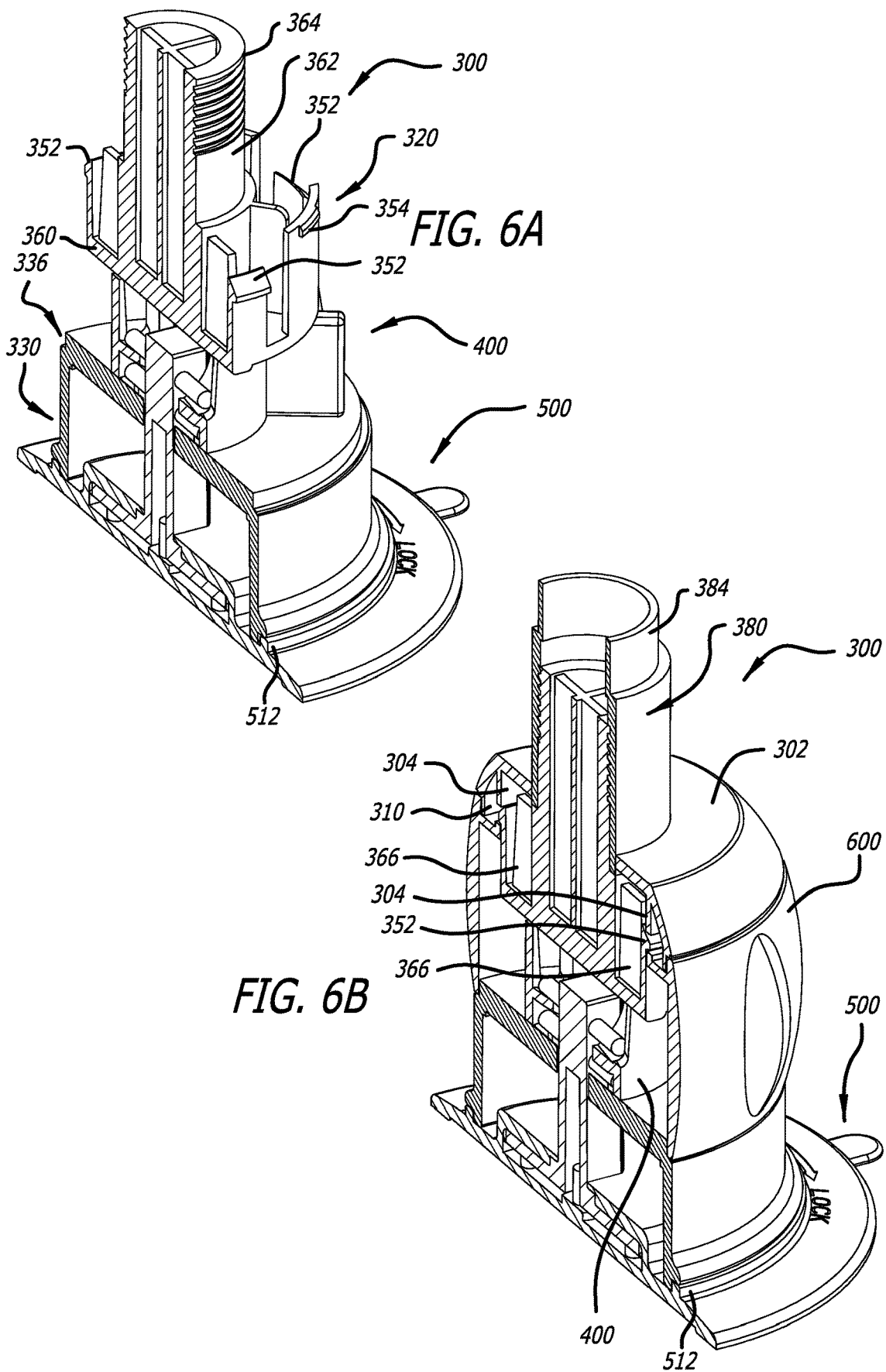

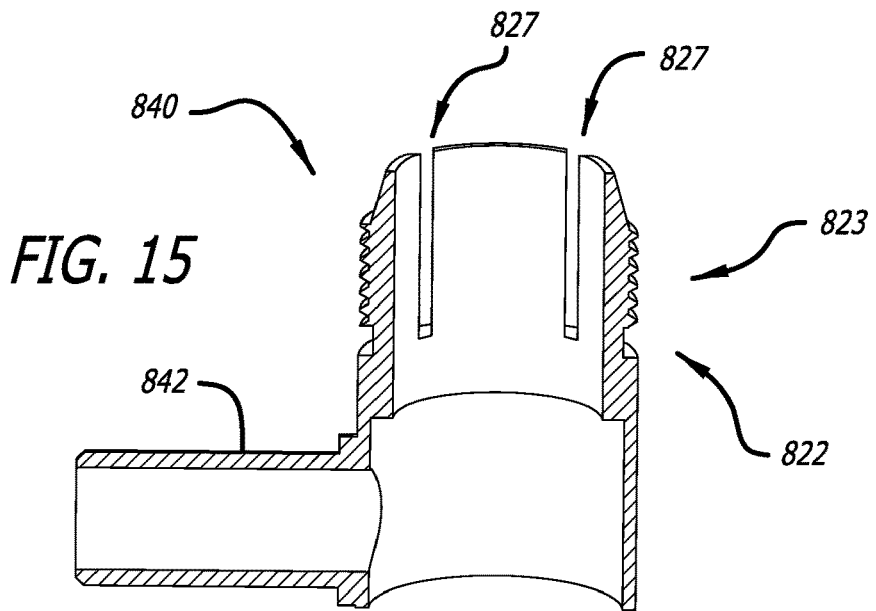
FIG. 15
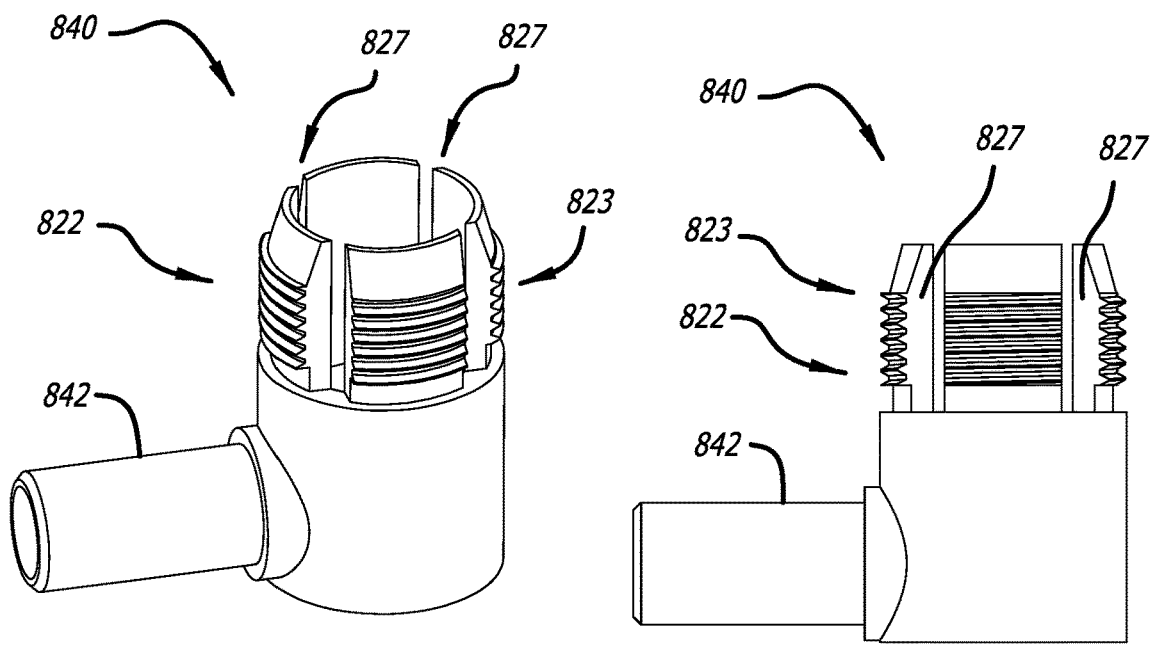
FIG. 16
FIG. 17

PERSPECTIVE ADJUSTABLE VIEWING APPARATUS WITH BASE SUCTION DEVICE FOR LOCKING TO SURFACES

TECHNICAL FIELD

The present invention relates generally to portable mirrors and mirror devices (not permanently secured to a wall or other structure as in the manner of a fixture), in particular, a viewing apparatus (including a mirror) that is perspective/height adjustable and/or selectively securable (lockable) to surfaces.

BACKGROUND ART

A great variety of portable mirrors and mirror devices are known. Features variously found in prior mirrors and mirror devices include mechanisms and devices facilitating, for example, adjustability of mirror (reflective glass) orientation, or securing a mirror to a wall or to a base, stand, frame or other support structure.

It would be useful to be able to provide a viewing apparatus that includes a mirror with a mechanism or device that facilitates one or more of improved, advantageous, or otherwise desirable viewing apparatus qualities and/or features. In this regard, it would be useful to be able to provide such a viewing apparatus that is safely repositionable and securable in user preferred/created configurations. It would be useful to be able to provide a viewing apparatus that is perspective/height adjustable and/or selectively securable (lockable) to surfaces.

SUMMARY OF THE INVENTION

In an example embodiment, a viewing apparatus that is selectively securable to surfaces includes: a mirror; a base; and an interconnection assembly between the mirror and the base; wherein the base is configured to allow a user to selectively lock or unlock the viewing apparatus to/from a surface and includes a housing, a suction device supporting the housing, a lifter connected to the suction device, a lock/unlock selector supported by and rotatable in relation to the housing, and a coupler including guide surfaces, the coupler being operatively interconnected between interior surfaces of the selector and drive contacts of the lifter, the coupler repositioning with the selector as the selector is rotationally repositioned in relation to the housing, the guide surfaces raising or lowering the lifter and a central portion of the suction device in relation to the housing as the coupler is rotationally repositioned increasing or decreasing the volume of a space between an underside surface of the suction device and the surface depending upon a direction of rotation of the selector in relation to the housing to lock or unlock the viewing apparatus, respectively.

In an example embodiment, a perspective adjustable viewing apparatus includes: a mirror; a base; and an interconnection assembly coupled or connected to the mirror and the base, the interconnection assembly including arms and pivot joint assemblies, the pivot joint assemblies each including a pair of fittings that provide an inner tube and an outer tube, respectively, which are interfitted and rotatable in relation to each other when in an unlocked configuration of the pivot joint assembly, the outer tube of each pivot joint assembly including threaded and tapered exterior portions and the pivot joint assemblies each including a sleeve fitted about the outer tube, the sleeve having a threaded and tapered interior portion that interfits with the threaded and tapered exterior portions, adjacent exterior portions being configured with slots therebetween such that the sleeve when advanced along the outer tube bears against and inwardly repositions the threaded and tapered exterior portions to frictionally engage with the inner tube preventing the inner and outer tubes from rotating in relation to each other in a locked configuration of the pivot joint assembly.

In an example embodiment, a height adjustable viewing apparatus includes: a mirror; a base; and an interconnection assembly coupled or connected between the mirror and the base, the interconnection assembly including an adjustable arm and a height lock/unlock device, the adjustable arm including a pair of interfitting tubes which are interfitted and telescopically slidable in relation to each other when in an unlocked configuration of the adjustable arm, the pair of cylindrical tubes including an inner tube and an outer tube coupled to the base, the lock/unlock device including a sleeve fitted about the inner tube and an extender secured to and within the upper end of the outer tube, the sleeve having a threaded and tapered interior portion that interfits with threaded and tapered exterior portions at and defined by slots along a distal end of the extender, the sleeve and the extender being configured such that the sleeve when repositioned toward the extender bears against and inwardly repositions extender portions at the distal end to frictionally engage with the inner tube preventing the inner tube and the outer tube from repositioning in relation to each other in a locked configuration of the adjustable arm.

BRIEF DESCRIPTION OF THE DRAWINGS

FIG. 3 is an exploded isometric top perspective view of the base showing in this view (from bottom to top) a suction device, a housing (structure), a lock/unlock selector and a winged coupler therein, and a cap;

FIG. 3A is a cross-sectional isometric top perspective view of the base showing a lifter and upper and lower drive bars (of the suction device) and upper and lower guide surfaces (of the winged coupler) therebetween, and lower latches (of the housing) that position adjacent to interior portions (of the lock/unlock selector) securing and facilitating rotational repositioning of the lock/unlock selector in relation to the housing—the cap is not shown in this view;

FIG. 3B is another cross-sectional isometric top perspective view of an upper portion of the base showing upper latches (of the housing) that locate and engage within inner wall recesses (of the cap), respectively, securing the cap to the housing and preventing rotational repositioning of the cap in relation to the housing, and a lower housing (portion) including an opening sized to allow insertion of the lifter and the upper and lower drive bars (of the suction device) therethrough during assembly, with the lock/unlock selector supported between circumferential top periphery surfaces (of the lower housing) and circumferential bottom periphery surfaces (of the cap)—the winged coupler and the suction device are not shown in this view;

FIG. 6A is a cross-sectional isometric top perspective view of the base showing the upper and lower latches and other structural details of the housing—the cap and the lock/unlock selector are not shown in this view;

FIG. 6B is the cross-sectional isometric top perspective view of FIG. 6A further including the cap and the lock/unlock selector (of the base) and a reducer adapter threaded into position, at a threaded top portion of the housing, through and circumferentially enclosed within a central top opening of the cap;

FIG. 15 is another cross-sectional isometric perspective view of the threaded elbow fitting of FIG. 14A;

FIGS. 16 and 17 show the threaded elbow fitting (of FIGS. 9A, 9B and 10) in an isometric perspective view and a front plan view, respectively;

FIG. 18A is a magnified view of DETAIL A (of FIG. 18) showing a pivot joint assembly that includes a ball joint fitting;

FIG. 18B is a magnified view of DETAIL B (of FIG. 18) showing an adapter (or reducer adapter) secured in place at the top of the base;

DISCLOSURE OF INVENTION

Example embodiments or implementations of the technologies described herein involve a viewing apparatus that is selectively securable to surfaces, an interconnection assembly (of or for such an apparatus) and/or a base suction device (of or for the viewing apparatus or interconnection assembly).

Figure 1:
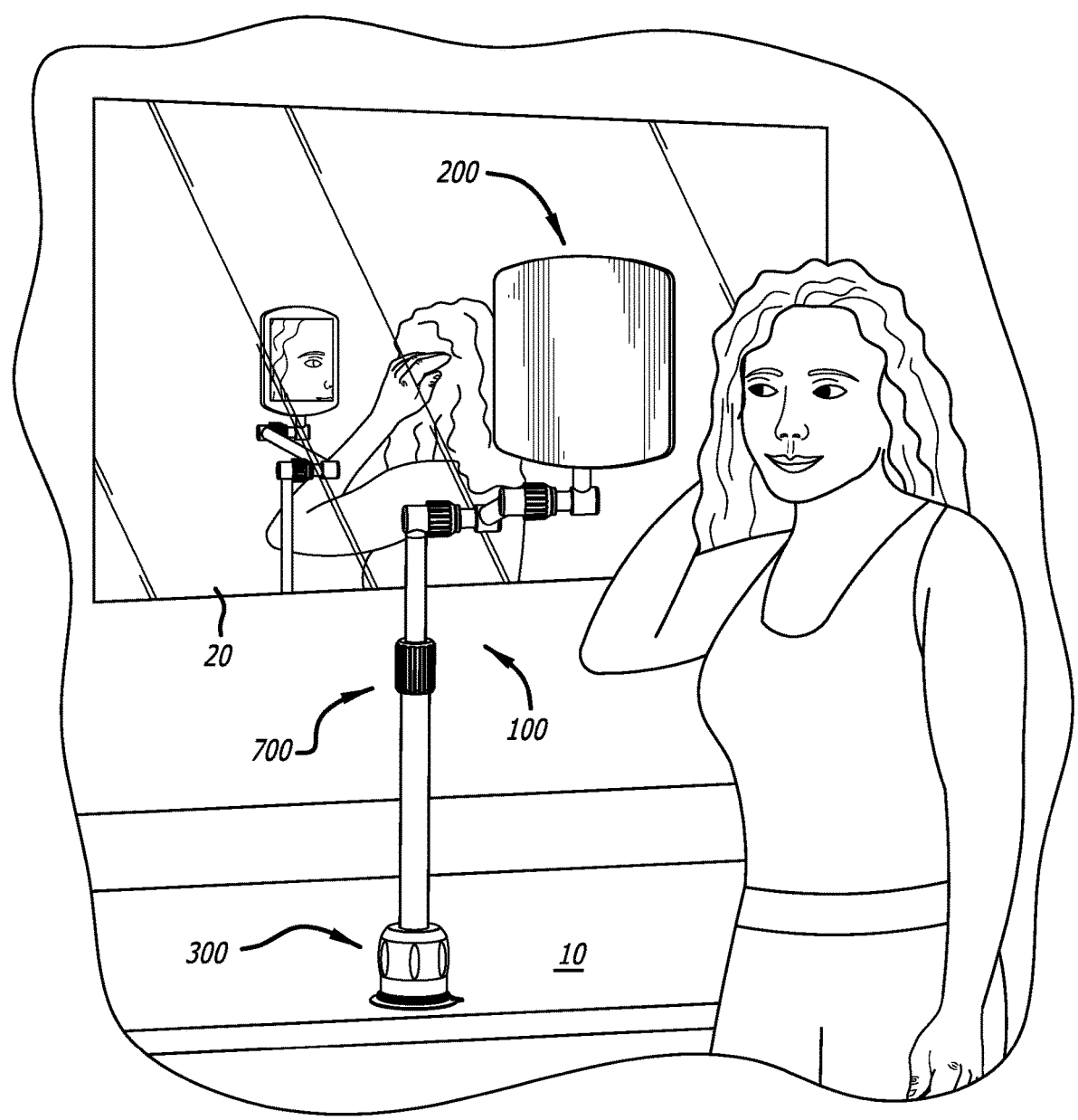
FIG. 1 is an isometric perspective view of an example embodiment of a portable perspective adjustable viewing apparatus (also referred to herein as a mirror apparatus, a mirror device, or mirror product) that includes a mirror, a base and an interconnection assembly, and in this view shown in use and secured to a countertop surface, the mirror device being utilized in conjunction with a second mirror facilitating multiple different viewing angles for greater ease and hands-free control in hair styling or other actions or projects for which it is helpful to be able to see oneself from behind (e.g., from the perspective of a person standing behind you)
Figure 1A:
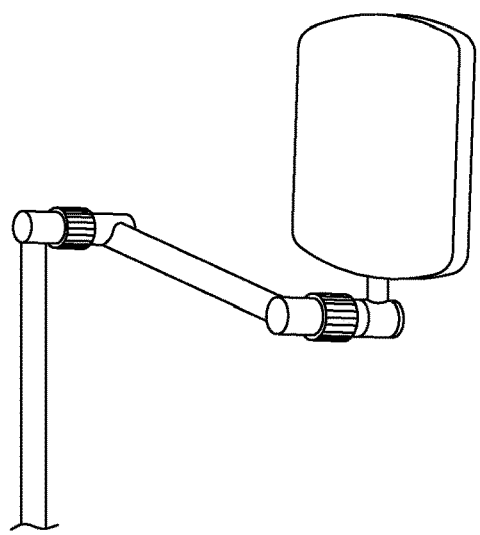
FIG. 1A is an isometric perspective view showing an upper portion (of the viewing apparatus of FIG. 1) including in this view the mirror and several arms, or segments, of the interconnection assembly.
Figure 1B:
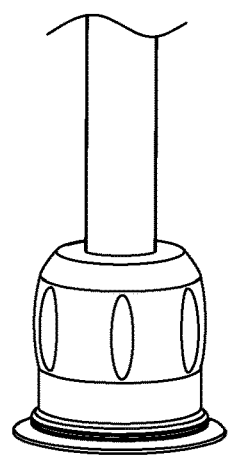
FIG. 1B is an isometric perspective view showing a lower portion (of the viewing apparatus of FIG. 1) including in this view the base and an arm, or segment, of the interconnection assembly.
Figure 1C:
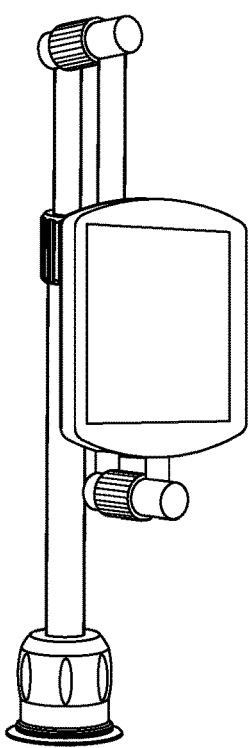
FIGS. 1C and 1D are isometric perspective views showing the viewing apparatus of FIG. 1 and illustrating two different examples of possible configurations for the mirror and the arms/segments of interconnection assembly in relation to the base.
Figure 1D:
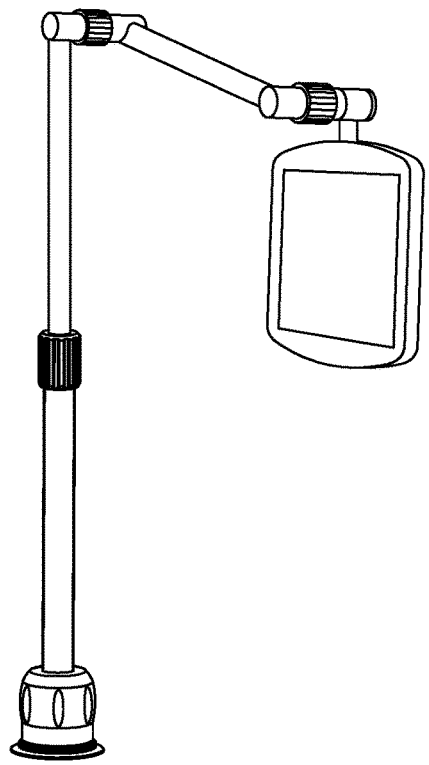

Referring to FIGS. 1-21, in an example embodiment, a viewing apparatus 100 includes a mirror 200, a base 300 and an interconnection assembly 700 between the mirror 200 and the base 300. In FIG. 1, the viewing apparatus 100 (which can alternatively be referred to as a mirror product or mirror device) is shown in use and secured to a surface 10 (e.g., a countertop). The mirror device 100 can be utilized in conjunction with another mirror 20 (e.g., a bathroom mirror) facilitating user access to and control (selection and setting) of multiple different viewing angles for greater ease and hands-free control in hair styling or other actions or projects for which it is helpful to be able to see oneself from behind (e.g., from the perspective of a person standing behind you).

Figure 2:
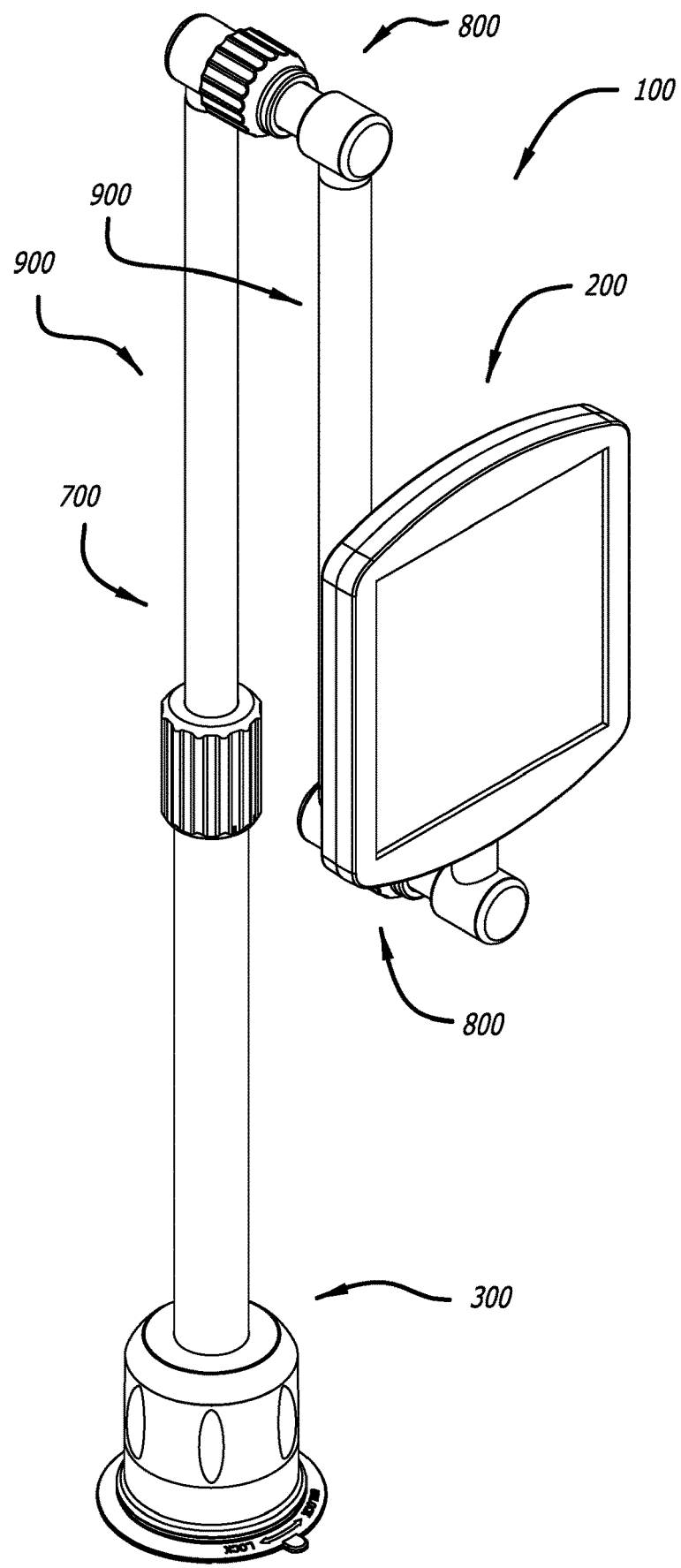
FIG. 2 is an isometric top perspective view showing the viewing apparatus of FIG. 1 in another example configuration in which a telescopic portion of the interconnection assembly is extended to its maximum height (or length)

The interconnection assembly 700 includes arms and pivot joint assemblies (or pivot joints), such as for example the arms 900 and the pivot joint assemblies 800 described herein (and with reference to FIGS. 9A-18B). FIGS. 1A-1D show different examples of possible configurations for the mirror and the arms and pivot joint of the interconnection assembly. FIG. 2 shows the viewing apparatus 100 in another example configuration in which an adjustable arm (telescopic portion) of the interconnection assembly is extended to its maximum height (or length).

In example embodiments and configurations, the mirror device includes a base configured to allow a user to secure (e.g., lock) the mirror device to a countertop or like surface. The base can be configured to allow a user to selectively lock or unlock the viewing apparatus to/from a surface (a countertop or like surface, for example). The surface can be a generally flat smooth surface, whether horizontal, vertical or otherwise oriented. For example, and with reference to FIGS. 3-8B, the base 300 includes a cap 302, a housing (or housing structure) 320, a coupler (or winged coupler) 400, a suction device 500, and a selector (or lock/unlock selector) 600.

Referring to FIGS. 3 and 3A, the suction device 500 supports (and is secured to) the housing 320 at a bottom portion of the housing. In this regard, the suction device 500 includes a flexible suction interface portion 510 (e.g., a flexible diaphragm shaped/configured as shown). The flexible diaphragm 510 includes a ridge 512 that is fitted about and adjacent to a circumferential/periphery recess 322 and secured to the housing 320 at the bottom 324 (of the housing). Referring also to FIGS. 5A, 5B, 8A and 8B, the base 300 includes a lifter 550 and upper and lower drive bars (or drive contacts) 560, 562 (of or coupled with the suction device 500 as described herein) extending from opposite sides of the lifter. The lifter 550 includes a (disc-shaped) lower portion 570 encased/enclosed within the flexible suction interface portion 510. In this manner, the lifter 550 is connected to (e.g., secured within a central portion 514 of and adjacent to the flexible diaphragm 510, that is, adjacent to an upper portion 520 of the flexible diaphragm), or may be described as a component of the suction device (e.g., integrally formed therewith). The (disc-shaped) lower portion 570 includes openings 572 (e.g., cylindrical as shown—FIG. 5A), and the suction device 500 includes interconnection posts/structures 522 extending through the openings 572 connecting the upper portion 520 to a lower central portion 530 (of the flexible diaphragm 510). The interconnection posts/structures 522 (e.g., cylindrically shaped and integrally formed with the upper and lower portions 520, 530 as shown—FIGS. 8A and 8B), ensure that the lower central portion 530 moves with the upper portion 520 when the lifter 550 repositions away from the mounting surface and upward in relation to the housing.

Referring to FIGS. 3, 3A, 3B, 6A and 6B, the housing 320 includes a lower housing (portion) 330 and an upper housing (portion) 350 between which the winged coupler 400 is located and supported at its (substantially planar) bottom and top sides, respectively. The lower housing (portion) 330 includes or is provided with an opening 332 (FIG. 3B) which is sized and shaped (e.g., as shown) to allow insertion of the lifter 550 and the lower drive bar 562 (of the suction device 500) therethrough during assembly, and to laterally support the lifter therein. In this regard, the opening 332 includes a central portion 334 with surfaces that are complementary in shape to the sides of the lifter (at opposite sides of the drive bars 560, 562), which allows the lifter 550 to slidably/vertically reposition—while also preventing the lifter 550 from rotating, in relation to the housing 320 and the winged coupler 400.

Figure 4A:
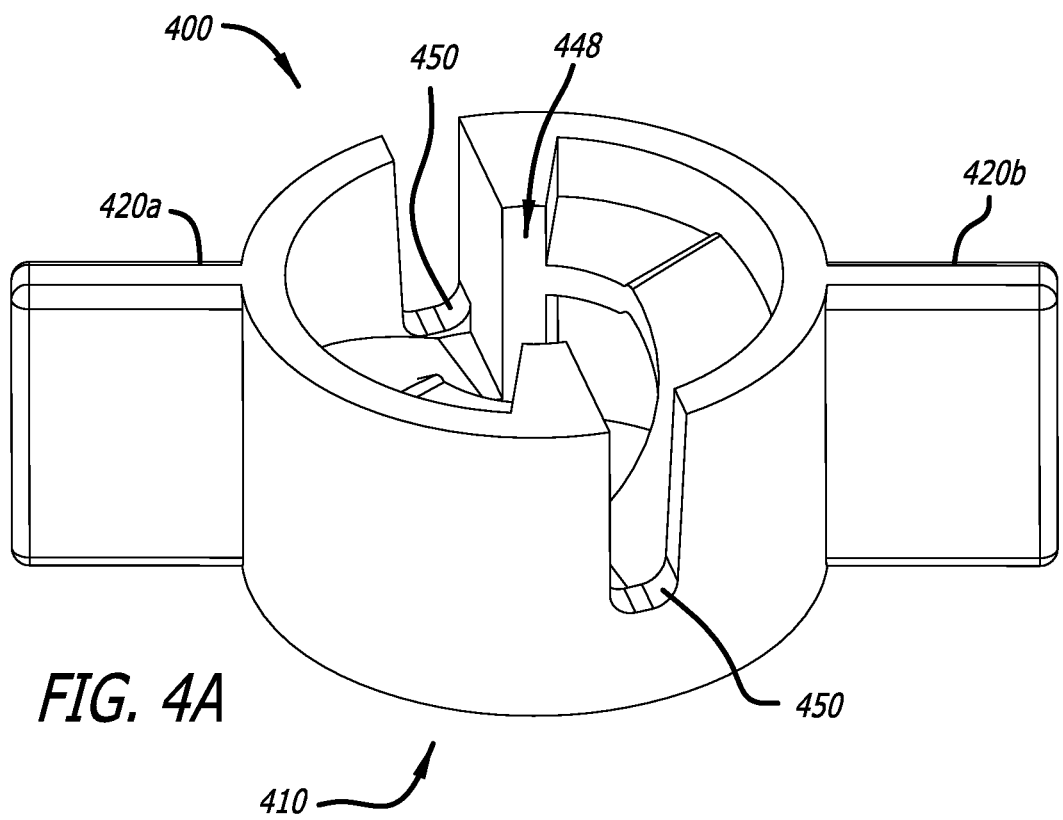
FIG. 4A is an isometric top perspective view of the winged coupler.
Figure 4B:
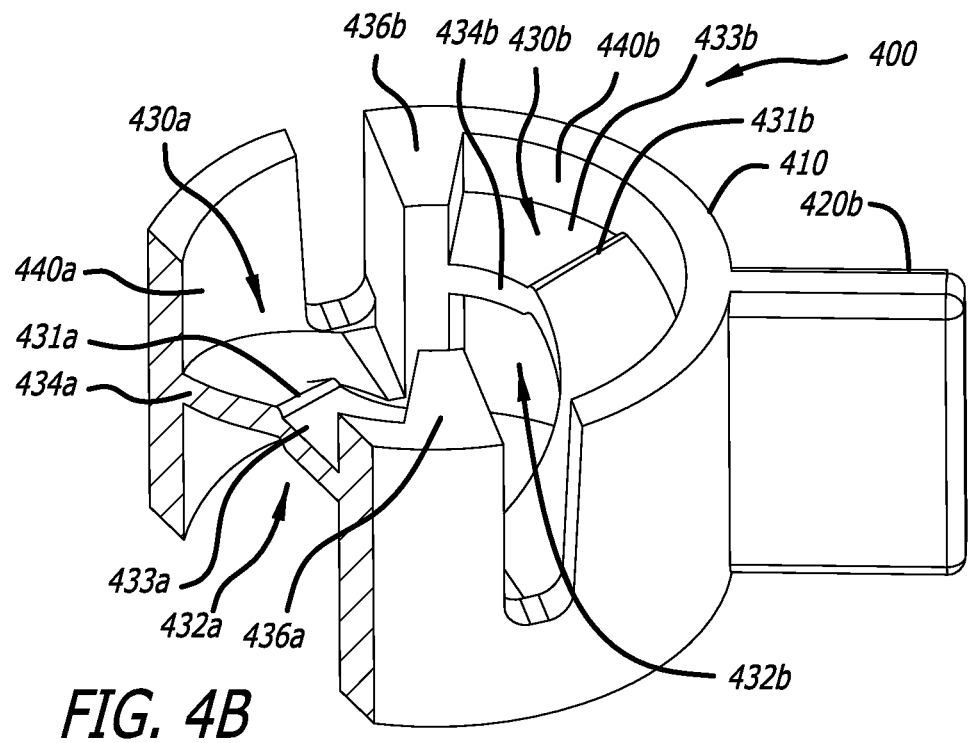
FIG. 4B is the isometric top perspective view of FIG. 4A with a portion (of the winged coupler removed and) depicted in cross section to show surface contours/transitions of the upper and lower guide surfaces of the winged coupler.

Referring to FIGS. 4A and 4B, the winged coupler 400 includes a generally cylindrical coupler main body 410 and a pair of wings 420a, 420b extending from opposite sides of the coupler main body. Within the coupler main body 410, upper guide surfaces (or paths) 430a, 430b and lower guide surfaces (or paths) 432a, 432b are provided (e.g., as shown).

During assembly, the coupler 400 is positioned within the housing above the opening 332 (FIG. 3B) and then the lifter 550 with the lower drive bar 562 attached is slid upward, through the opening 332 and continuing through a centrally located circular opening 448 of the coupler 400, into operational position with the lower drive bar 562 adjacent to the lower guide surfaces 432a, 432b and the upper portion of the lifter 550 extending through the circular opening 448 (of the coupler). The upper drive bar 560 can now be installed into the upper drive bar opening of the lifter. In this regard, the coupler 400 additionally includes (or is provided with) U-shaped channels 450 (e.g., channels in and at opposing sides of the coupler main body 410 extending from the top side of the coupler and positioned and sized as shown) which allow the upper drive bar 560 to be installed (from either side of the coupler). With the lifter 550 and the drive bars 560, 562 connected to the coupler 400, the selector 600 can now be installed, i.e., slid downward into place and mechanically coupling the selector with the wings of the coupler as further discussed below.

Figure 5A:
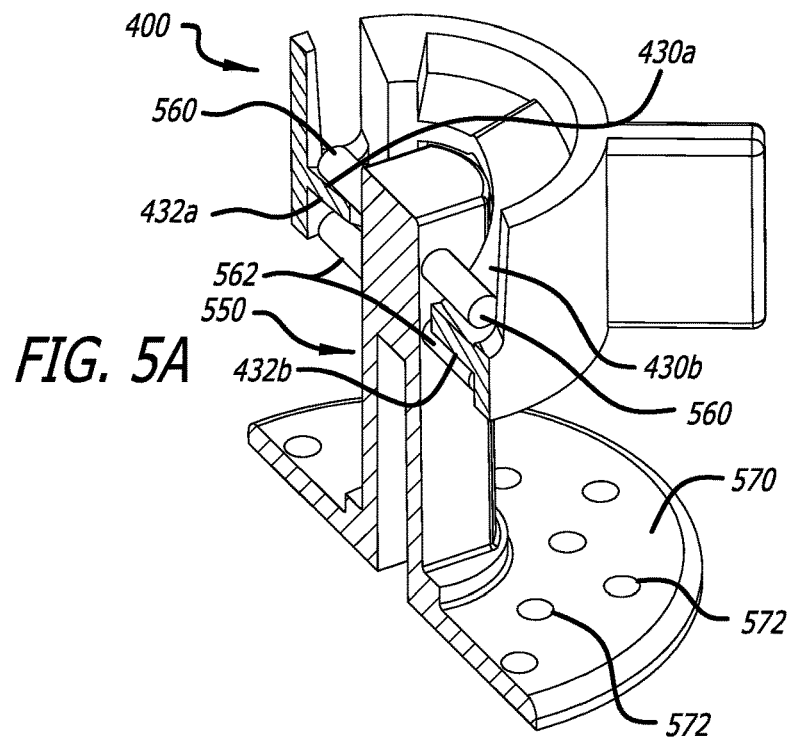
FIG. 5A is a cross-sectional isometric top perspective view showing the winged coupler and the lifter and upper and lower drive bars (of the suction device)—the flexible suction interface portion of the suction device is not shown in this view.
Figure 5B:
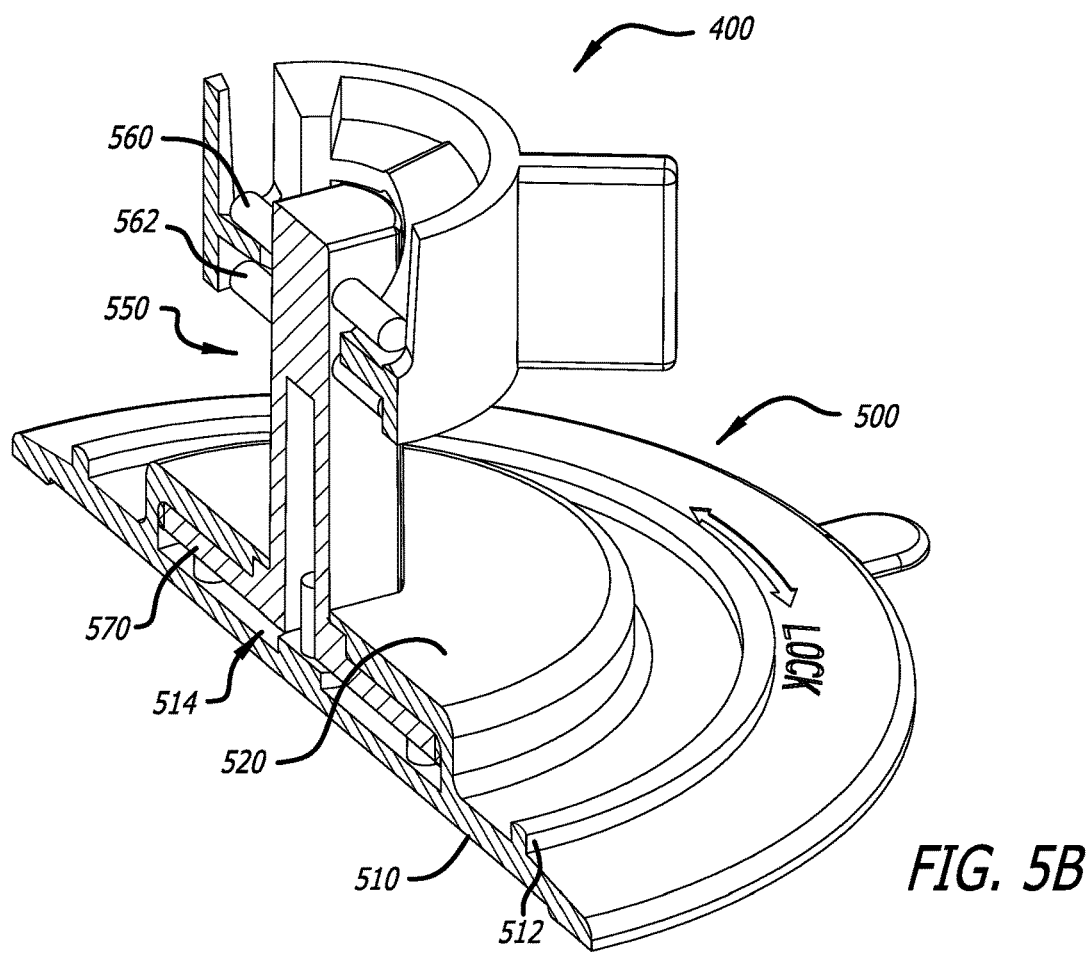
FIG. 5B is the cross-sectional isometric top perspective view of FIG. 5A further including the flexible suction interface portion, the lower portion of the lifter being encased within (integrally formed with) the flexible suction interface portion.
Figure 7A:
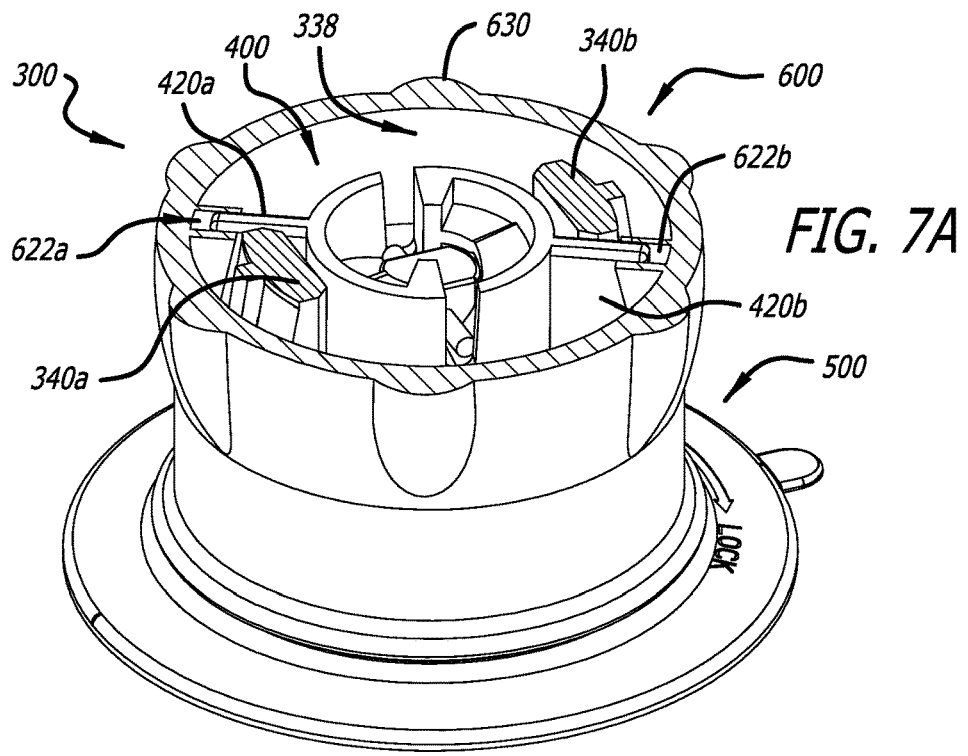
FIG. 7A is a cross-sectional isometric top perspective view of the base when in its unlocked configuration showing the lock/unlock selector and the winged coupler, the winged coupler including a generally cylindrical coupler main body and a pair of wings extending from opposite sides of the cylindrical main body, the lock/unlock selector including dual channels (at opposite interior portions of the lock/unlock selector) within which the wings are located, and the housing including (as structural portions extending upward from the lower housing and through the interior portion of the base circumscribed by the lock/unlock selector) dual wing stops against(/adjacent to) which the wings are repositioned when the lock/unlock selector is moved to its unlock position.
Figure 7B:
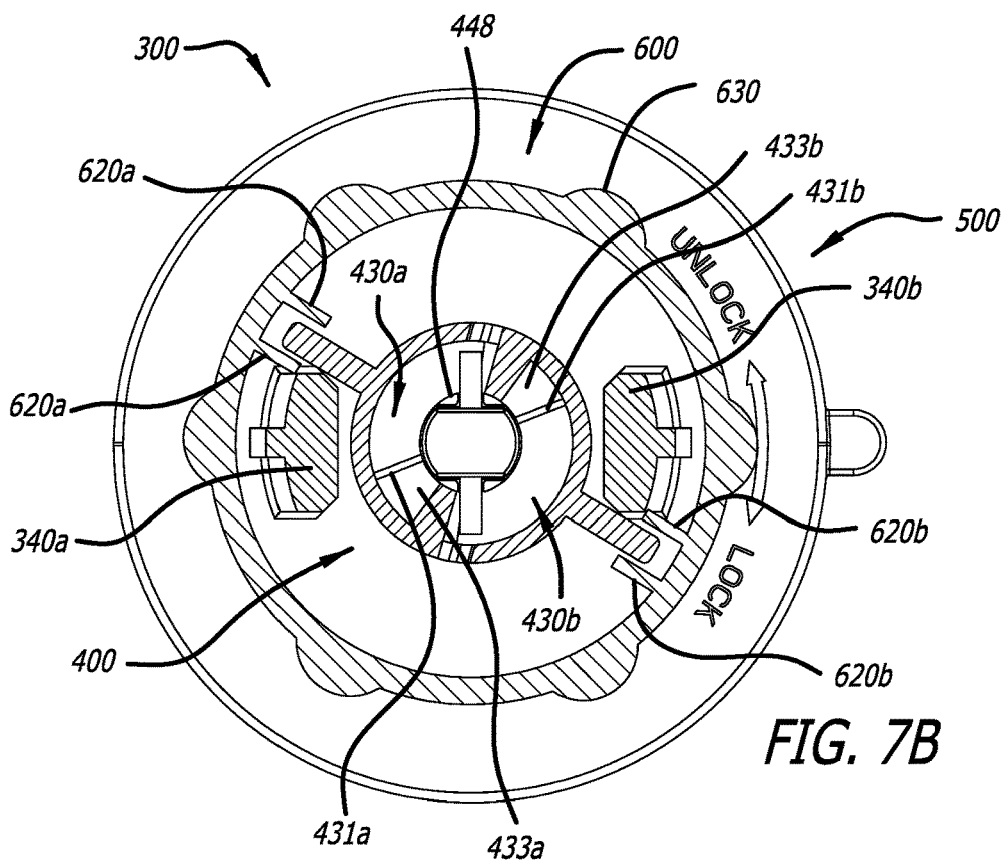
FIG. 7B is a top view of the cross-section of the base of FIG. 7A showing the top of the lifter, upper drive bar portions extending from opposite sides of the lifter, and upper guide surfaces within the cylindrical main body (of the winged coupler), the guide surfaces including a pair of ridges over which the upper drive bar portions are repositioned to detent into a pair of recesses (of the upper guide surfaces), respectively, when the lock/unlock selector is moved to its lock position.
Figure 8A:
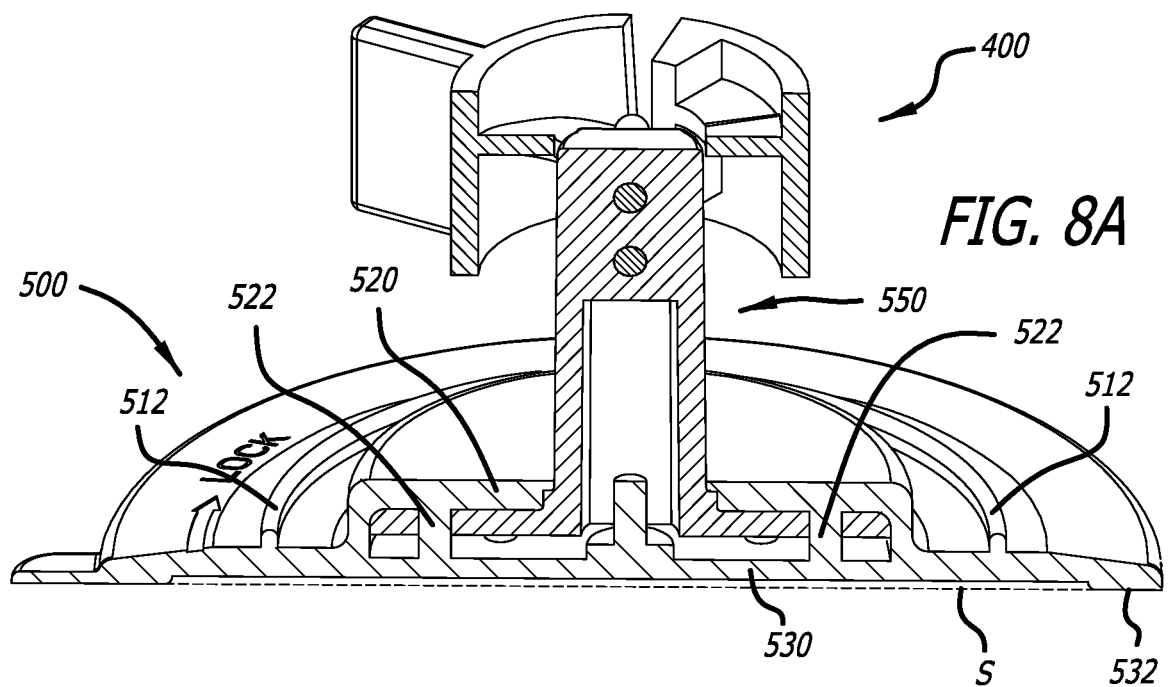
FIG. 8A is a cross-sectional isometric top perspective view of the winged coupler and the suction device when the base is in its unlocked configuration—other portions of the base are not shown in this view.
Figure 8B:
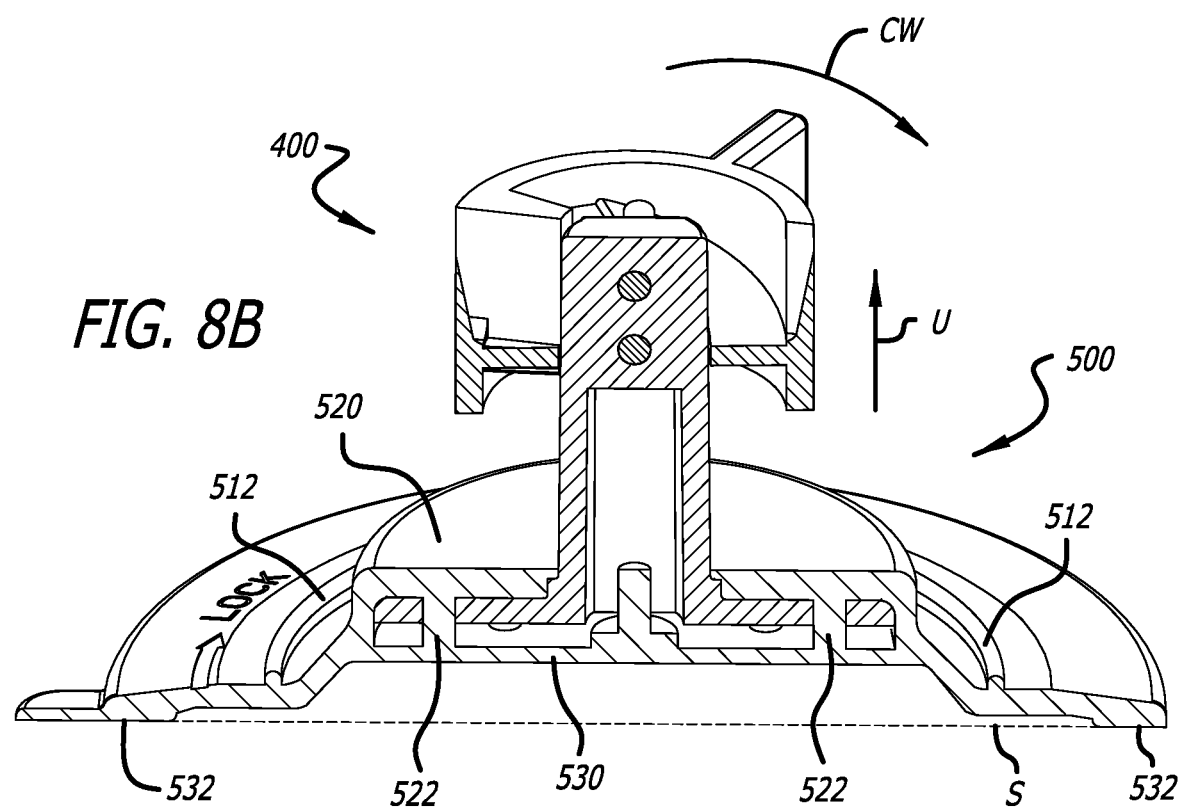
FIG. 8B shows the winged coupler and the suction device of FIG. 8A with the winged coupler rotated clockwise (as viewed from top perspective) when the lock/unlock selector (not shown) is rotated clockwise toward its lock position, the lifter being raised upward (in relation to the main body of the winged coupler and the housing) as the winged coupler is rotated clockwise, the lifter raising the central portion of the flexible diaphragm (in relation to the housing) which increases the volumetric size of the space between the bottom of the flexible diaphragm and the surface upon with the base is located thereby creating vacuum suction; and a pair of recesses into which the upper drive bar portions are advanced and detent into after moving over the ridges, respectively.

The winged coupler 400 is operatively interconnected between interior surfaces of the lock/unlock selector 600 and the drive contacts (the upper and lower drive bars 560, 562) of the lifter 550. Referring also to FIGS. 7A and 7B, the interior surfaces include two pairs of vertical fins 620a, 620b at opposite sides of the lock/unlock selector 600, each pair defining a channel (channels 622a, 622b) within which one of the wings (wings 420a, 420b, respectively) is located. Referring to FIG. 5A, the upper and lower drive bars 560, 562 extend from opposite sides of the lifter 550. The winged coupler 400 includes curved guides (or curved guide portions/structures) 434a, 434b (FIG. 4B) within and adjacent to the cylindrical inside wall surfaces 440a, 440b of the coupler main body 410. The coupler 400 also includes stops (or walls) 436a, 436b between and defining opposing ends of the upper guide surfaces (or paths) 430a, 430b and the lower guide surfaces (or paths) 432a, 432b. In this example embodiment, the stops (or walls) 436a, 436b are generally wedge shaped (e.g., as shown) and extend radially inward from the cylindrical inside wall surfaces 440a, 440b—both above and below the curved guides 434a, 434b, providing stop surfaces (for the drive bars 560, 562) at the ends of the upper guide paths 430a, 430b and the lower guide paths 432a, 432b.

The curved guides (or curved guide portions/structures) 434a, 434b of the coupler 400 are driven to reposition between the drive bars 560, 562 when the wings 420a, 420b (of the coupler 400) are repositioned, i.e., rotated in relation to the housing 320, by rotatably repositioning the selector 600. In this regard, the curved guides 434a, 434b are defined in part (inclusive of locations thereon which serve as contact interfaces with the drive bars) by the upper guide surfaces 430a, 430b facing the upper drive bar 560 and by the lower guide surfaces 432a, 432b facing the lower drive bar 562. In this example embodiment, the vertical distance between the upper guide surface 430a and the lower guide surface 432a is approximately the same along (from one end to the other of) the curved guide 434a; and the vertical distance between the upper guide surface 430b and the lower guide surface 432b is approximately the same along (from one end to the other of) the curved guide 434b. Referring to FIGS. 4B and 7B, the coupler 400 includes ridges/transitions and recesses located along the guide surfaces. In this example embodiment, the upper guide surfaces (or paths) 430a, 430b include ridges/transitions 431a, 431b and (adjacent to the ridges/transitions) recesses 433a, 433b, respectively.

Referring to FIGS. 3, 7A and 7B, the housing 320 further includes (as structural portions extending upward from the lower housing 330 and through the interior 338 of the base 300 circumscribed by the lock/unlock selector 600) dual wing stops 340a, 340b between which the wings 420a, 420b are repositionable when the lock/unlock selector 600 is moved from its unlock position to its lock position, and vice versa. The lock/unlock selector 600 provides a rotatable ring (exterior portion of the base) having an exterior including raised surface portions 630 configured to facilitate easier visual or tactile identification of the selector and gripability.

In this example embodiment, the lock/unlock selector 600 is supported by and rotatable in relation to the housing 320. In this regard, and referring to FIGS. 3A, 3B, 6A and 6B, the selector 600 includes (at a top portion thereof) an inwardly facing circular wall 602 (e.g., adjacent to a top periphery/exterior portion of the selector), a circular rail (or track) 604 within the selector, and a support 606 (e.g., a ledge) adjacent to and extending inwardly from the wall 602 and supporting the circular rail (or track) 604. The upper housing (portion) 350 includes outwardly extending cantilevered members 352 configured to position over the circular rail (or track) 604 thereby securing the lock/unlock selector 600 to the housing while also facilitating (allowing) rotational repositioning of the selector in relation to the housing. In this example embodiment, four outwardly extending cantilevered members 352 are located about and extend upward (e.g., as shown) from the periphery of upper housing base 360.

Referring to FIGS. 3, 3A, 3B, 6A and 6B, the upper housing (portion) 350 also includes latch members (or upper latches) 354 configured, for example, as shown positioned about the periphery of the upper housing base 360 alternating with, but extending higher in relation to the lock/unlock selector 600 than, the outwardly extending cantilevered members (or lower latches) 352. The cap 302 includes a circular inside wall 304 (e.g., downwardly extending) with openings 306 provided in the wall 304 (e.g., four openings equidistantly spaced thereabout) that receive therein and engage with the latch members 354 securing the cap 302 to and preventing the cap from rotating in relation to the housing 320. The cap 302 also includes a circular side wall 310, e.g., adjacent the bottom periphery of the cap and extending downward therefrom as shown. When the cap 302 is secured in place (above and adjacent to the selector 600 as shown in FIG. 3B), the circular side wall 310 interfits with (within) and supports the selector 600 at an upper periphery portion 610 of the selector (the circular wall 602 and ledge 606 being located adjacent to the outward facing and bottom sides/portions of the wall 310, respectively), and a circular recess 336 at a top periphery portion of the lower housing 330 interfits with (within) and supports the selector 600 at a lower periphery portion 610 of the selector.

Referring to FIGS. 3A, 3B, 6A and 6B, the upper housing 350 includes a cylindrical upper central portion 362 that includes or is provided with a threaded top portion 364. In this example embodiment, the base 300 (or the viewing apparatus 100) further includes an adapter 380 which has an interior threaded portion and is internally configured/shaped to be interfitted with and secured to the cylindrical upper central portion 362 of the housing. The adapter 380, at its base, fits within a central opening 308 of the cap 302. The adapter 380 includes a connection portion 384 provided, for example, in the form of a reducer adapter or inside fitting portion configured to be interconnected with (e.g., within a cylindrical opening of) an arm or arm segment. The upper housing 350 can also include support structures, such as fins 366 (e.g., radially extending outward and integrally formed with the base 360 as shown), below the top of the cap 302 and extending laterally adjacent to the circular inside wall 304 of the cap 302. The adapter 380 can be modified or provided in other forms and/or multiple different (additional) adapters can be provided such that the base 300 can support other/different interconnections and apparatuses than those expressly described herein.

In operation, and with reference to FIGS. 7A-8B, as the lock/unlock selector 600 is moved/rotated toward its lock position (as indicated by the arrow denoted "CW" in FIG. 8B), the curved ramped surfaces of the coupler (the upper guide surfaces or paths 430a, 430b) bear against the upper drive bar 560—at both ends thereof extending from the upper portion of the lifter, which pulls the lifter upward in relation to the housing (as indicated by the arrow denoted "U" in FIG. 8B), the ends of the upper drive bar 560 finding a detent engagement after advancing past the ridges/transitions 431a, 431b and locating in the recesses 433a, 433b, respectively. The suction created by so repositioning the dual drive bars (by rotating the selector to its lock position) increases the volume of the space (indicated by the dashed line denoted "S" in FIGS. 8A and 8B) between the underside (or underside surface(s)) of the suction device 500 and the surface (to which the base is mounted) which locks the base to the surface, the space S being sealed at the periphery 532 of the flexible diaphragm. The coupler 400 repositions with the selector 600 as the selector is rotationally repositioned in relation to the housing, the guide surfaces raising or lowering the lifter 550 and the central portion 514 of the suction device in relation to the housing as the coupler is rotationally repositioned increasing or decreasing the volume of the space S depending upon a direction of rotation of the selector in relation to the housing to lock or unlock the viewing apparatus, respectively.

The coupler 400 includes ridges/transitions located along the guide surfaces and is configured such that movement of the coupler through or substantially through its full angular range of movement, defined and limited at opposite ends thereof by stops within the housing, advances the dual drive bars sufficiently far around curved paths (of the coupler) defined by the guide surfaces to move the drive bars past the ridges/transitions and into recesses of the coupler to lock the base. In an example embodiment, the angular range of movement of the winged coupler is around 117° and the angular range of movement of the dual bars (within the coupler) is around 133°. In some implementations, the base is configured such that a downward bias imparted on the lifter by the suction device biases the ends of the upper drive bar to locate (e.g., to remain seated) in the recesses.

Thus, in an example embodiment, a viewing apparatus that is selectively securable to surfaces includes: a mirror; a base; and an interconnection assembly between the mirror and the base (e.g., an interconnection assembly including arms and pivot joints configured to facilitate repositionability of the arms in relation to each other); wherein the base is configured to allow a user to selectively lock or unlock the viewing apparatus to/from a surface and includes a housing, a suction device supporting the housing, a lifter connected to the suction device, a lock/unlock selector supported by and rotatable in relation to the housing, and a coupler including guide surfaces, the coupler being operatively interconnected between interior surfaces of the selector and drive contacts (e.g., upper and lower drive bars) of the lifter, the coupler repositioning with the selector as the selector is rotationally repositioned in relation to the housing, the guide surfaces raising or lowering the lifter and a central portion of the suction device in relation to the housing as the coupler is rotationally repositioned increasing or decreasing the volume of a space between an underside surface of the suction device and the surface depending upon a direction of rotation of the selector in relation to the housing to lock or unlock the viewing apparatus, respectively. By way of example, the coupler includes a pair of wings, and the selector includes two pairs of vertical fins at opposite sides of the selector, each pair defining a channel within which one of the wings is located. In example embodiments and implementations, the suction device includes a flexible diaphragm and the lifter is secured within the central portion and adjacent to the flexible diaphragm. In this example embodiment, the housing includes lower latches (e.g., such as the outwardly extending cantilevered members 352) that position adjacent to interior portions of the selector securing and facilitating rotational repositioning of the selector in relation to the housing. The housing can also include a cap, positioned above the selector, and upper latches (e.g., such as the latch members 354) that locate and engage within inner wall recesses of the cap securing the cap to the housing and preventing rotational repositioning of the cap in relation to the housing. In this example embodiment, the housing includes a lower housing portion with an opening configured to receive and laterally support the lifter therein. The selector is supported by and between a portion of the housing and the cap, for example, between circumferential top periphery surfaces (e.g., such as those of the circular recess 336) of the lower housing and circumferential bottom periphery surfaces (e.g., such as those of the circular side wall 310) of the cap. In example embodiments and implementations, the suction device includes a flexible suction interface portion, and the lifter includes a disc-shaped lower portion enclosed within the flexible suction interface portion. The coupler can include, by way of example, a generally cylindrical coupler main body and a pair of wings extending from opposite sides of the coupler main body. The housing can also include, as structural portions (thereof) extending through an interior portion of the base circumscribed by the lock/unlock selector, dual wing stops against which the wings are repositioned when the selector is moved to its unlock position. In an example embodiment, the lifter includes drive bar portions extending from opposite sides of the lifter, and the coupler includes guide surfaces within a cylindrical main body of the coupler, the guide surfaces including ridges over which the drive bar portions are repositioned to detent into recesses of the coupler when the selector is moved to its lock position. In example embodiments and implementations, the coupler and the lifter are configured such that the lifter is raised upward in relation to the coupler and the housing as the coupler repositions driven by the selector, the lifter raising the central portion of the flexible diaphragm in relation to the housing increasing the volumetric size of the space between the bottom of the flexible diaphragm and the surface upon with the base is located thereby creating vacuum suction. The lock/unlock selector can be provided, by way of example, in the form of a rotatable ring having an exterior including raised surface portions configured to facilitate easier visual or tactile identification of the selector and gripability. In example embodiments and implementations, the drive contacts are dual drive bars, and the coupler includes ridges/transitions located along the guide surfaces and is configured such that movement of the coupler through or substantially through its full angular range of movement, defined and limited at opposite ends thereof by stops within the housing, advances the dual drive bars sufficiently far around curved paths (of the coupler) defined by the guide surfaces to move the drive bars past the ridges/transitions and into recesses of the coupler, after which suction created by so repositioning the dual drive bars locks the base to the surface.

Example embodiments or implementations of the technologies described herein involve a height adjustable viewing apparatus, an interconnection assembly (of or for such an apparatus) and/or a height(/length) adjustable arm, stand or other portion (of or for the viewing apparatus or interconnection assembly).

Figure 9A:
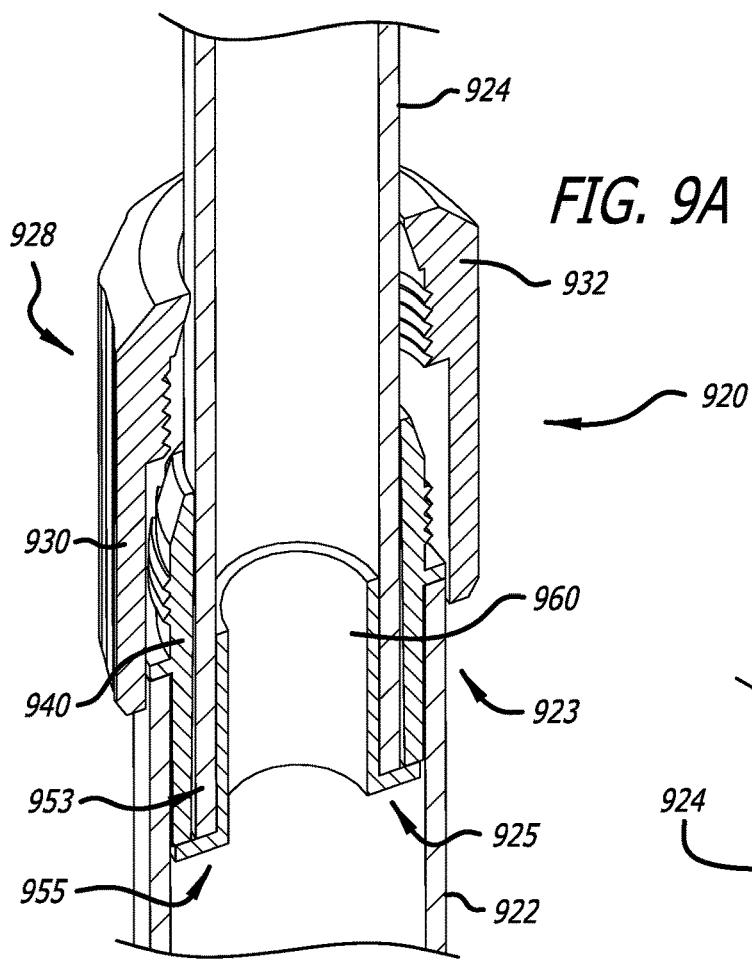
FIG. 9A is a cross-sectional isometric top perspective view showing (in part) a height(/length) adjustable arm of the interconnection assembly, the adjustable arm including a pair of slidably interfitting tubes (an outer tube and an inner tube) and a height(/length) lock/unlock device including a sleeve (fitted about the inner/upper tube) and an extender secured to and within the upper end of the outer tube, the extender including an inside connector portion and an exterior extension portion that is threaded, tapered and slotted, the lock/unlock device being shown in this figure in its unlocked position in which the inner and the outer tubes can be slidably and rotatably repositioned in relation to each other as desired by a user.
Figure 9B:
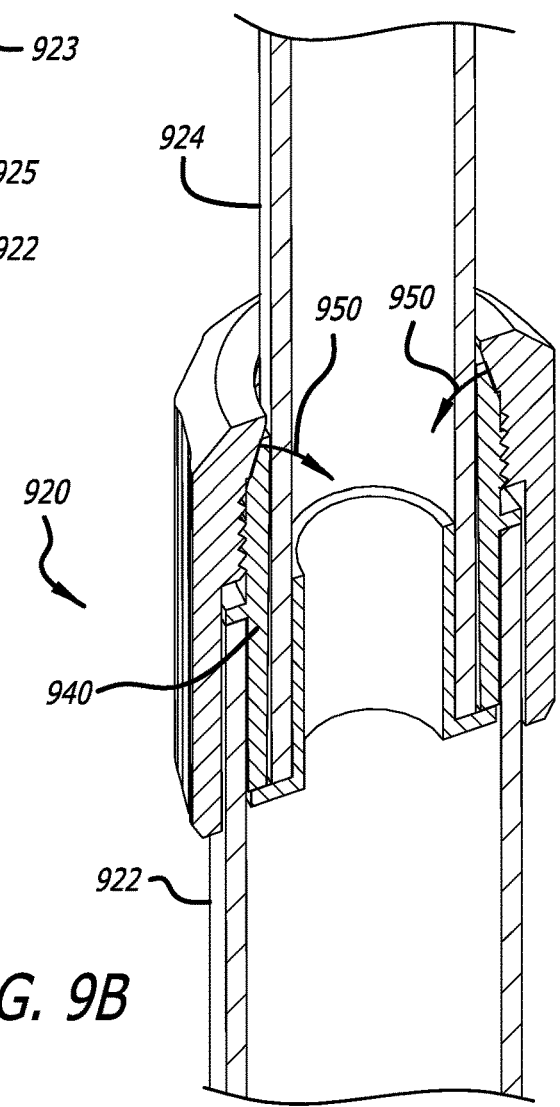
FIG. 9B shows the adjustable arm of FIG. 9A with the lock/unlock device in its locked position, the sleeve including a threaded interior portion that interfits with the threaded exterior portions of the extender, the sleeve also including a tapered interior portion adjacent to the threaded interior portion, the exterior portions (of the extender) being configured with slots therebetween such that the sleeve when repositioned downward by rotating clockwise (as viewed from top perspective) bears through contact with its tapered interior portion against the tapered exterior portions inwardly repositioning the slotted portions to frictionally engage with the inner tube preventing the inner and the outer tubes from sliding and rotating in relation to each other in a locked configuration of the height(/length) adjustable arm.
Figure 10:
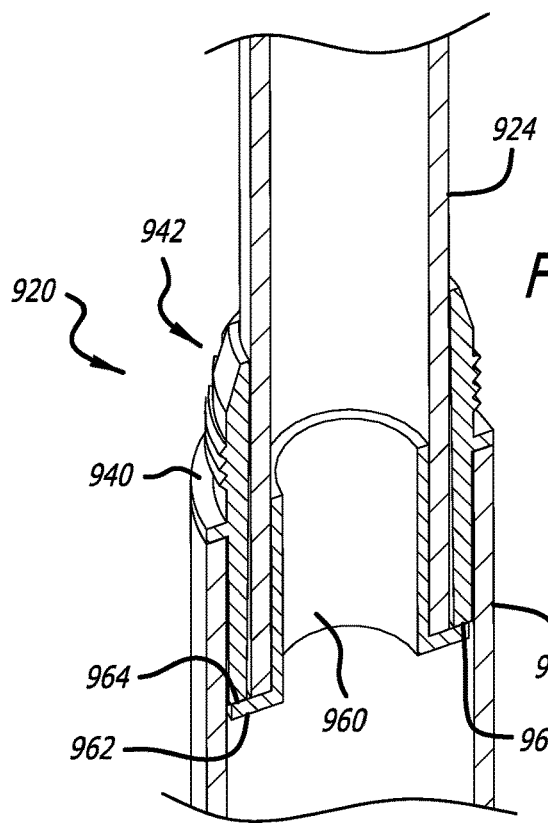
FIG. 10 shows the lock/unlock device of FIGS. 9A and 9B without the sleeve.
Figure 11:
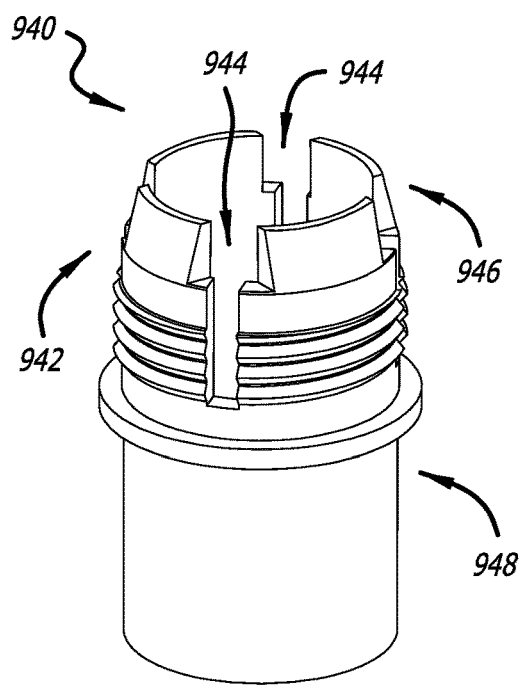
FIGS. 11 and 12 show the tube extender (of FIGS. 9A, 9B and 10) in an isometric top perspective view and a front view, respectively.
Figure 12:
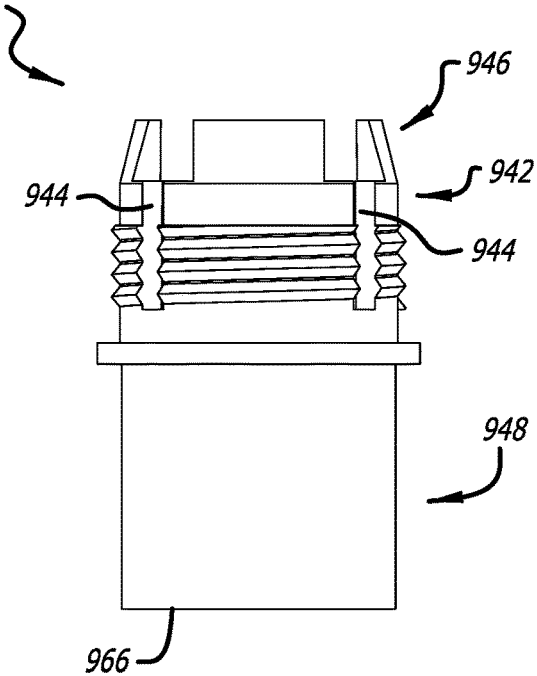

Referring to FIGS. 9A-12, a height(/length) adjustable arm 920 (of the interconnection assembly 700) includes a pair of slidably interfitting tubes (an outer(/lower) tube (or arm segment) 922 and an inner(/upper) tube (or arm segment) 924) and a lock/unlock device 928 including a sleeve. The lock/unlock device 928 includes a sleeve 930 fitted about the inner(/upper) tube 924 and an extender 940 secured to and within the opening 925 at the upper end 923 of the outer(/lower) tube 922. The extender 940 including an inside connector portion 948 (such as an internal spigot) and threaded and tapered exterior portions 942 (e.g., as shown in FIGS. 11 and 12). The extender 940 can be provided in the form of an inside/outside fitting as shown, for example, which can be described as an inside fitting modified to include an extender (outside portion) having external threads, a tapered distal portion, and recesses/channels (e.g., threaded and tapered exterior portions 942 at and defined by slots 944 along and extending from a distal end 946 of the extender 940 as shown). In FIG. 9A, the lock/unlock device 928 is shown in its unlocked position in which the interfitting tubes can be slidably (telescopically/longitudinally) and rotatably repositioned as desired by a user, e.g., sliding and/or rotating the inner(/upper) tube 924 in relation to the outer(/lower) tube 922 (or vice versa).

FIG. 9B shows the adjustable arm 920 with the lock/unlock device 928 in its locked position. The sleeve 930 includes a threaded and tapered interior portion 932 that interfits with the threaded and tapered exterior portions 942 (of the extender 940), the exterior portions 942 of the extender being configured with(/defined by) slots 944 therebetween such that the sleeve 930 when repositioned downward by rotating clockwise (as viewed from top perspective) bears—through contact with its tapered interior portion—against the tapered exterior portions inwardly repositioning the slotted extender portions at the distal end 946 of the extender 940 (as indicated by arrows 950 in FIG. 9B), such repositioning being facilitated by the slotted and tapered configuration as well as the thickness and other dimensions of the exterior portions 942 and flexibility of materials from which the components of the lock/unlock device are made, to frictionally engage with the inner tube preventing the inner and the outer tubes from (telescopically/longitudinally) sliding and rotating in relation to each other in a locked configuration of the height(/length) adjustable arm.

Referring to FIGS. 9A and 10, in this example embodiment, the adjustable arm 920 also includes a bushing 960, which is friction fitted, cemented or otherwise secured to and within the opening 955 at the lower end 953 of the inner(/upper) tube 924. The bushing 960 including a periphery flange, ring or radial extension 962 which serves as a catch 964 in relation to a stop surface 966 (provided by the inside connector portion 948), thereby preventing the inner(/upper) tube 924 from being pulled out of its telescopic operational configuration and engagement with the outer(/lower) tube 922.

Thus, in an example embodiment, a height adjustable viewing apparatus includes: a mirror; a base; and an interconnection assembly coupled or connected between the mirror and the base, the interconnection assembly including an adjustable arm and a height lock/unlock device, the adjustable arm including a pair of interfitting tubes which are interfitted and telescopically slidable in relation to each other when in an unlocked configuration of the adjustable arm, the pair of cylindrical tubes including an inner tube and an outer tube coupled to the base, the lock/unlock device including a sleeve fitted about the inner tube and an extender secured to and within the upper end of the outer tube, the sleeve having a threaded and tapered interior portion that interfits with threaded and tapered exterior portions at and defined by slots along a distal end of the extender, the sleeve and the extender being configured such that the sleeve when repositioned toward the extender bears against and inwardly repositions extender portions at the distal end to frictionally engage with the inner tube preventing the inner tube and the outer tube from repositioning in relation to each other in a locked configuration of the adjustable arm. The inner tube fits within the extender, and is slidable in relation to the extender when the adjustable arm is unlocked. In example embodiments and implementations, the extender is secured at an inside connector portion thereof to and within an opening at the upper end of the outer tube. The adjustable arm can include a bushing, which is secured to and within an opening at the lower end of the inner tube, the bushing including a periphery flange, ring or radial extension which serves as a catch in relation to a stop surface provided by the inside connector portion, thereby preventing the inner tube from being pulled out of engagement and a telescopic operational configuration with the outer tube.

Example embodiments or implementations of the technologies described herein involve a perspective adjustable viewing apparatus, an interconnection assembly (of or for such an apparatus) and/or lockable pivot joint assemblies (of or for the viewing apparatus or interconnection assembly).

Figure 13A:
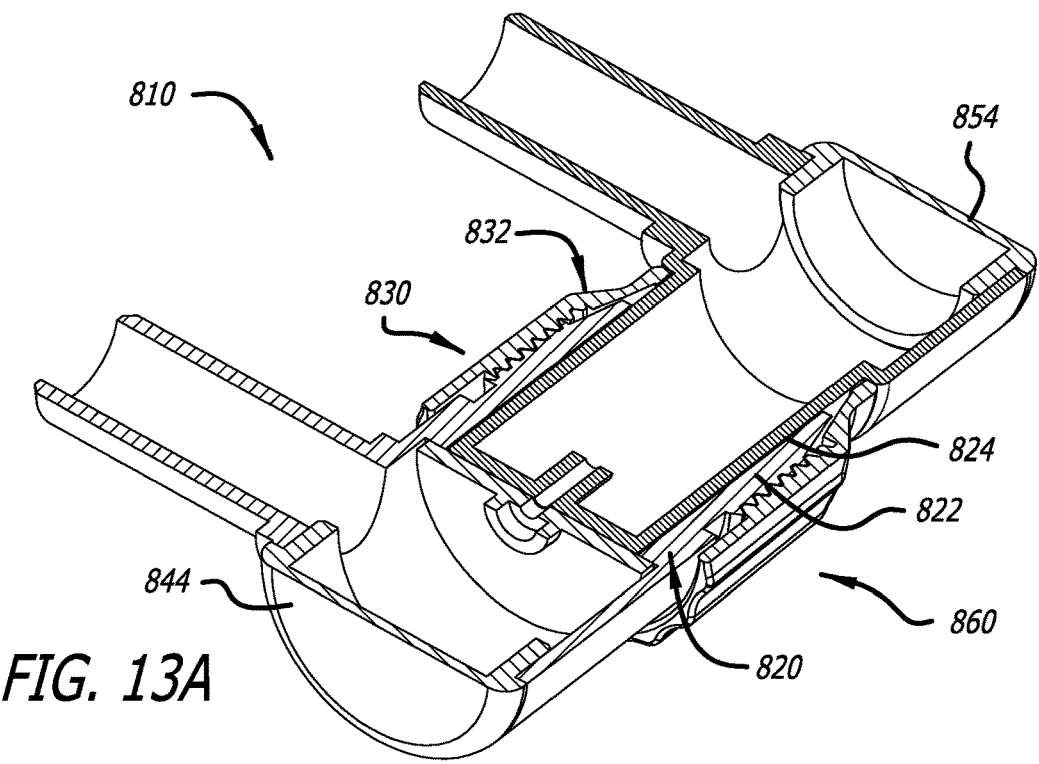
FIG. 13A is a cross-sectional isometric perspective view showing a pivot joint assembly of the interconnection assembly, the pivot joint assembly including a pair of slidably interfitting tubes (an outer tube and an inner tube, e.g., tube portions of two generally L-shaped components, respectively) and a lock/unlock sleeve (fitted about the inner tube and the outer tube) and an end portion (of the outer tube) that is threaded at exterior surfaces thereof, tapered and slotted, the lock/unlock sleeve being shown in this figure in its unlocked position in which the inner and the outer tubes can be rotatably repositioned in relation to each other as desired by a user.

Referring to FIGS. 13A-17, a pivot joint assembly 810 (of the interconnection assembly 700) includes a pair of fittings 820 (e.g., L-shaped connectors 840, 850 configured as shown) that provide an inner tube 824 and an outer tube 822, respectively, and a lock/unlock sleeve 830 fitted about the outer tube 822. The inner tube 824 and an outer tube 822 are interfitted and rotatable in relation to each other when in an unlocked configuration of the pivot joint assembly such as shown in FIG. 13A. In this example embodiment, the L-shaped connectors 840, 850 include inside connector portions 842, 852, and plugs 844, 854 (e.g., slip plugs), respectively. In FIG. 13A, the lock/unlock sleeve 830 is in its unlocked position in which the inner and the outer tubes can be rotatably repositioned as desired by a user, e.g., rotating the inner tube in relation to the outer tube (or vice versa).

Figure 13B:
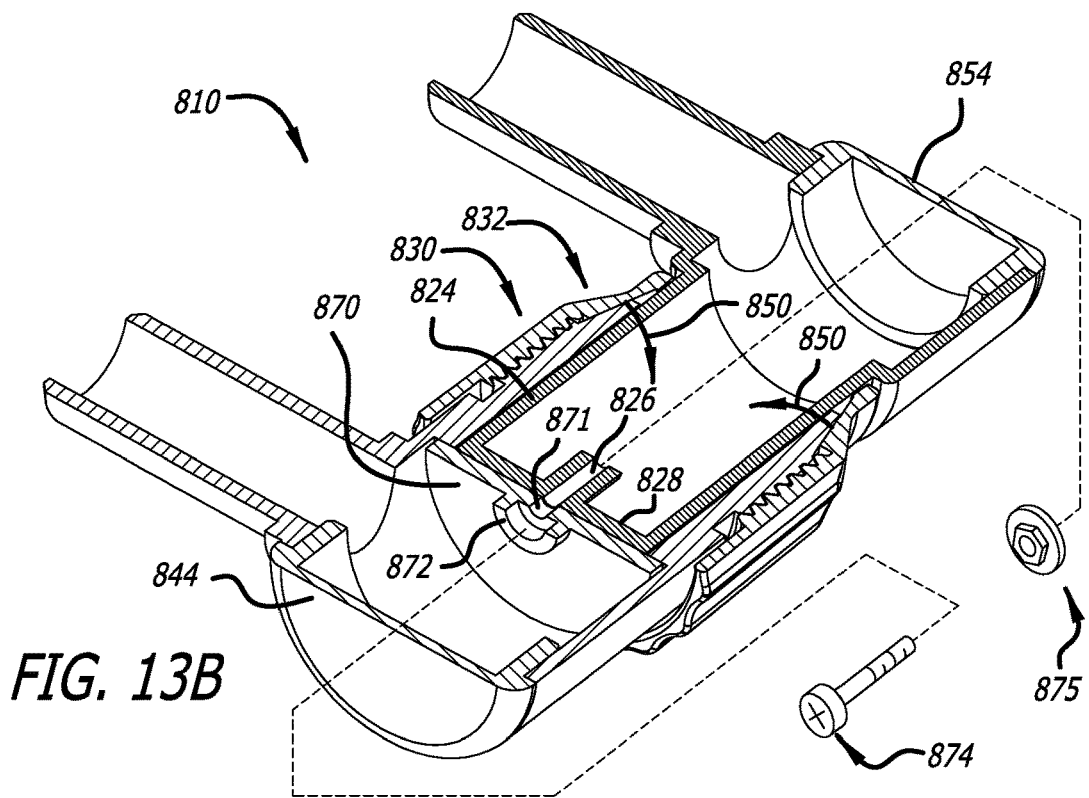
FIG. 13B shows the pivot joint assembly of FIG. 13A with the lock/unlock sleeve in its locked position, the sleeve including a threaded interior portion that interfits with the threaded exterior portions of the end portion of the outer tube, the sleeve also including a tapered interior portion adjacent to the threaded interior portion, the exterior portions (of the outer tube end portion) being configured with slots therebetween such that the sleeve when repositioned toward the threaded elbow fitting by rotating clockwise (as viewed from a perspective facing the threaded elbow fitting) bears through contact with its tapered interior portion against the tapered exterior portions inwardly repositioning the slotted portions to frictionally engage with the inner tube preventing the inner and the outer tubes from rotating (as well as longitudinally sliding) in relation to each other in a locked configuration of the pivot joint assembly.

FIG. 13B shows the pivot joint assembly 810 with the lock/unlock sleeve 830 in its locked position. The lock/unlock sleeve 830 includes a threaded and tapered interior portion 832 that interfits with threaded and tapered exterior portions 823 at an end (or extension) portion of the outer tube 822, the adjacent exterior portions being configured with(/defined by) slots 827 therebetween (e.g., as shown in FIGS. 16 and 17) such that the sleeve 830 when advanced along the outer tube by rotating clockwise (as viewed from a perspective facing the threaded elbow fitting 840) bears—through contact with its tapered interior portion—against the tapered exterior portions 823 inwardly repositioning the slotted end portions of the outer tube 822 (as indicated by arrows 850 in FIG. 13B), such repositioning being facilitated by the slotted and tapered configuration as well as the thickness and other dimensions of the outer tube end portion and flexibility of materials from which the components of the lock/unlock sleeve are made, to frictionally engage with the inner tube preventing the inner and outer tubes from rotating (as well as telescopically/longitudinally sliding) in relation to each other in a locked configuration of the pivot joint assembly. In this regard, the inner and outer tubes and the sleeve of each of the pivot joint assemblies provide a lockable interconnection arm 860. In example embodiments, each of the lockable interconnection arms is orthogonal lengthwise in relation to each of the arms to which it is coupled.

Figure 14:
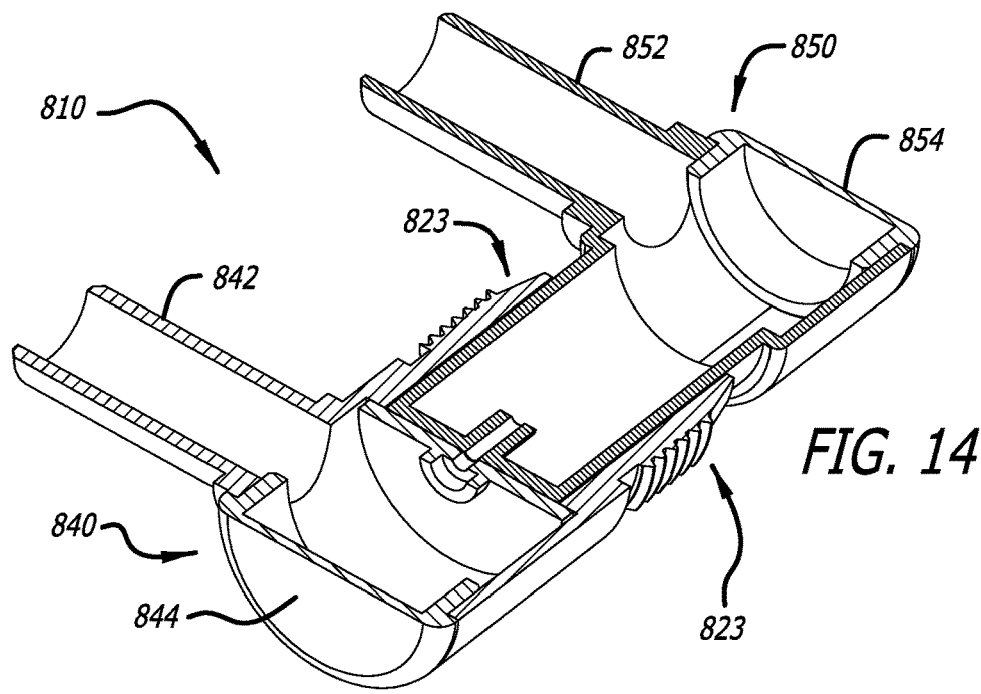
FIG. 14 shows the pivot joint assembly of FIGS. 13A and 13B without the sleeve.
Figure 14A:
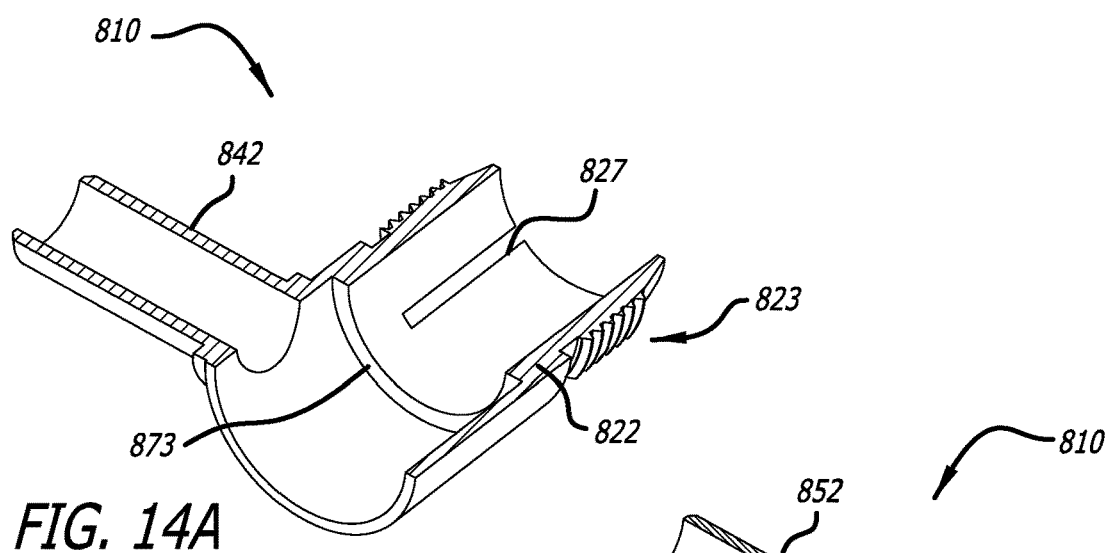
FIG. 14A shows the threaded elbow fitting of FIG. 14—without its end cap and insert piece.
Figure 14B:
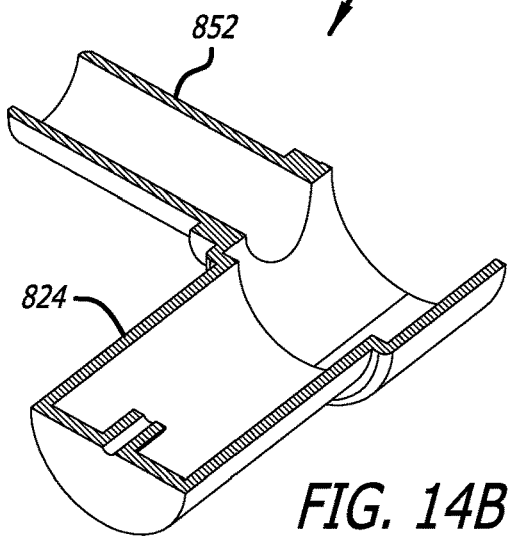
FIG. 14B shows the non-threaded (smooth) elbow fitting of FIG. 14—without its end cap.

Referring further to FIG. 13B, in this example embodiment, the inner tube 824 includes an inwardly directed channel 826 centrally located and supported by an end 828 (of the inner tube 824) thereabout, and the pivot joint assembly 810 further includes an insert 870 (e.g., provided in the form of a circular disc) including a centrally located bore 871 and a circular raised wall 872 thereabout. The end 828 and the insert 870 are configured such that when the insert is installed/secured in place adjacent (e.g., press fit and/or glued at its periphery) to the ridge 873 (FIG. 14A) within the outer tube and the inner tube is inserted into the outer tube, a pivot pin 874 can be installed with the head of the pivot pin being held within the raised wall and pivot pin post extending through the bore and into the coaligned channel. The pivot pin provides additional axial stability by maintaining central positioning of the inner tube within the outer tube. The pivot pin can be selected/sized to impart a desired amount of frictional resistance to rotation that can be overcome by the user when repositioning arms coupled to the pivot joint assembly at opposite ends thereof when the lock/unlock sleeve is in its unlocked position. In example embodiments/implementations, the pivot pin 874 can be provided (at the end of its post) with a fastener 875 (e.g., a lock nut, bushing, cotter pin or the like), installed during assembly, for example, via the end cap openings, to prevent the tubes from sliding apart while still allowing the tubes to be rotationally repositioned (in relation to the other) when the lock/unlock sleeve is in its unlocked position.

Example embodiments or implementations of the technologies described herein involve a perspective adjustable viewing apparatus, an interconnection assembly (of or for such an apparatus) and/or a lockable pivot joint assembly including a ball joint interface (of or for the viewing apparatus or interconnection assembly).

Figure 18:
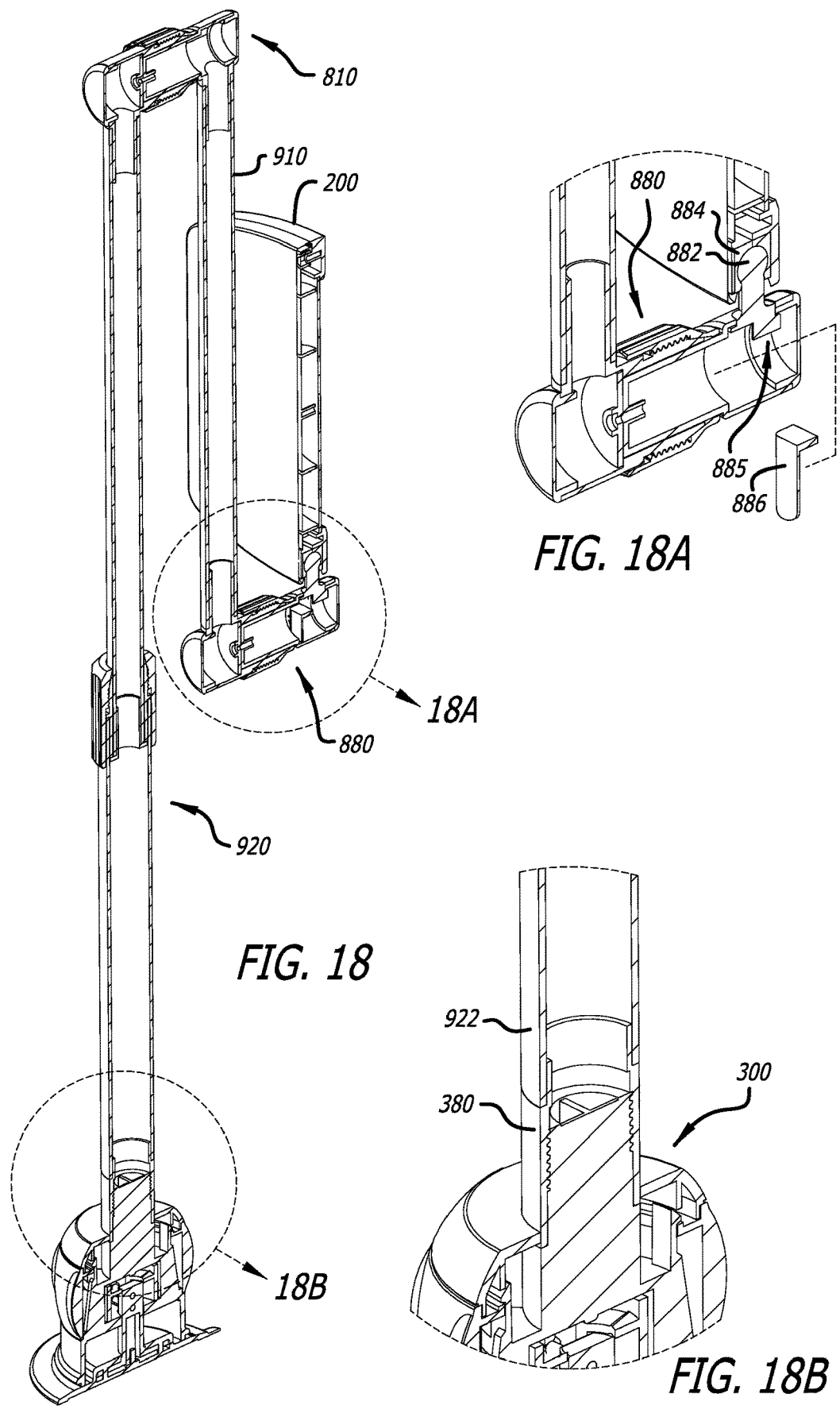
FIG. 18 shows the viewing apparatus (as in FIG. 2) in another isometric top perspective view and in cross-section.

Referring to FIGS. 18 and 18A, in this example embodiment, the interconnection assembly 700 includes a pivot joint assembly 880 with a ball joint (fitting) 882, operatively interfaced with a ball joint socket 884 of the mirror. The ball joint fitting can be a solid integrally formed piece, for example, such as the ball joint/base structure 885 (shown in FIG. 18A) installed through the end cap opening. Once seated at the inside of the opening with the ball joint 882 extending from the side of the inner tube, the ball joint is mechanically locked into place by first wedging the member 886 at its rectangular base into the recess (defined by bottom and side surfaces of the ball joint/base structure) and surfaces of the inner tube and across the inner tube adjacent to the reducer junction surface, and second installing the end cap—the ball joint/base structure including a cantilevered extension portion defining with the inside surface (of the inner tube adjacent to the end cap opening) a recess into which the end cap snuggly fits thereby securing the ball joint fitting in place. In other embodiments/implementations, a ball joint fitting can be permanently secured to (e.g., integrally formed with) an elbow or other fitting.

FIG. 18B shows the adapter (or reducer adapter) 380 secured in place at the top of the housing (of the base 300), the reducer adapter providing an inside fitting which the bottom opening of the adjustable arm interfits with allowing the interconnection assembly (and the mirror attached thereto) to be rotatably and longitudinally/vertically slidably repositioned in relation to the base.

Figure 19:
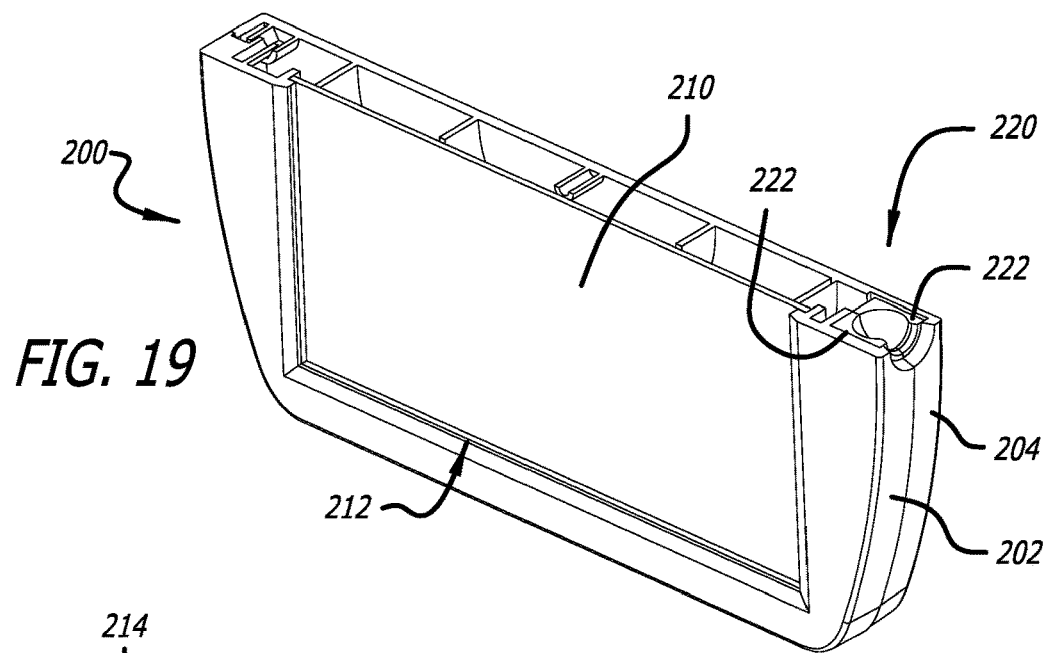
FIG. 19 is a cross-sectional isometric perspective view of the mirror assembly showing in cross section its front and back side enclosures between which the mirror and a ball joint socket enclosure are secured.
Figure 20:
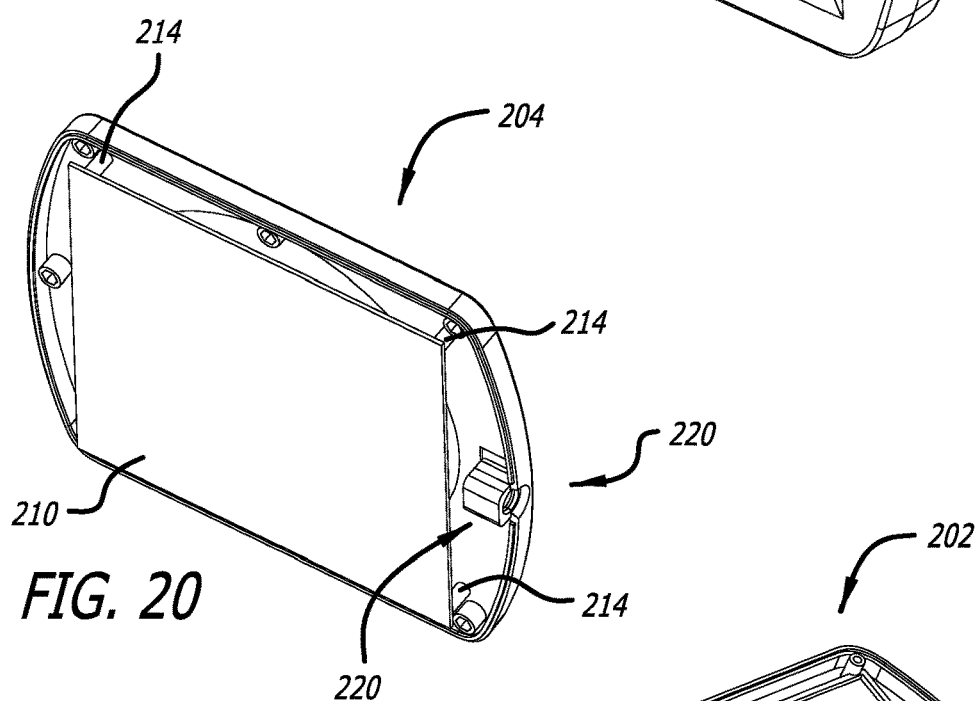
FIG. 20 is an isometric perspective view of the mirror assembly with the front enclosure removed.
Figure 21:
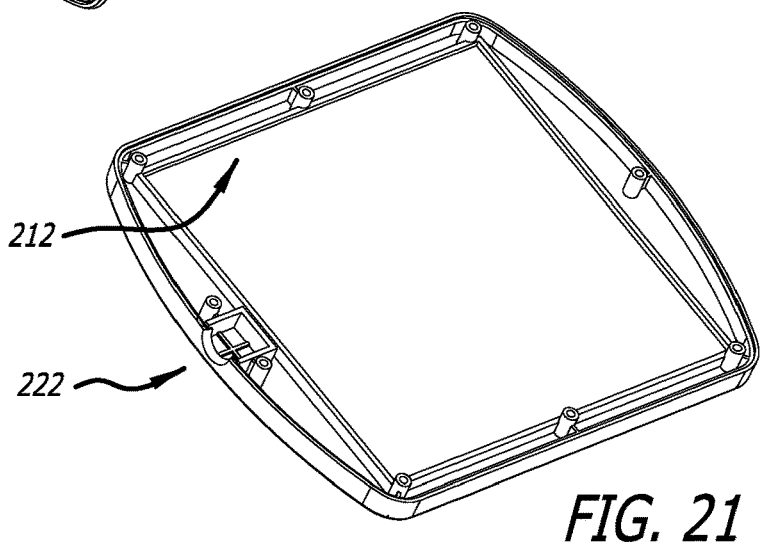
FIG. 21 is an isometric perspective view of the mirror assembly with the back enclosure and the mirror removed.

Referring to FIGS. 19-21, the mirror assembly 200 includes front side and back side enclosures 202, 204 between which the mirror 210 (e.g., reflective glass) and a ball joint socket enclosure 220 are secured. In this example embodiment, the back enclosure 204 includes support structures (posts) 214 that support the mirror at its back side, and the front enclosure 202 includes a mirror frame 212 configured (shaped and sized) to support the mirror at its periphery and front (reflective) side. The ball joint socket enclosure 220 is received and supported within a recess 222 provided by the front and back enclosures adjacent to the edge of the mirror. The front and back enclosures are secured together by screws, fasteners or the like (not shown).

In example embodiments or implementations, the inside fittings described herein are of a diameter and length, and sized in relation to the inner diameter of the arm ends, to allow rotational repositioning while providing a contact interface that imposes a sufficient amount of frictional resistance to gravity and similarly relatively weak forces that otherwise might cause the components to reposition (e.g., rotate or pivot) too rapidly after a sleeve is unlocked.

Thus, in an example embodiment, a perspective adjustable viewing apparatus includes: a mirror; a base; and an interconnection assembly coupled or connected to the mirror and the base, the interconnection assembly including arms and pivot joint assemblies, the pivot joint assemblies each including a pair of fittings that provide an inner tube and an outer tube, respectively, which are interfitted and rotatable in relation to each other when in an unlocked configuration of the pivot joint assembly, the outer tube of each pivot joint assembly including threaded and tapered exterior portions and the pivot joint assemblies each including a sleeve fitted about the outer tube, the sleeve having a threaded and tapered interior portion that interfits with the threaded and tapered exterior portions, adjacent exterior portions being configured with slots therebetween such that the sleeve when advanced along the outer tube bears against and inwardly repositions the threaded and tapered exterior portions to frictionally engage with the inner tube preventing the inner and outer tubes from rotating in relation to each other in a locked configuration of the pivot joint assembly. In example embodiments and implementations, one or both of the fittings of each of the pivot joint assemblies is provided in the form of an L-shaped component. In this example embodiment, at least one of the fittings of each of the pivot joint assemblies includes an inside connector over which one of the arms of the interconnection assembly is fitted. In example embodiments and implementations, the pivot joint assemblies each include one or more inside connectors and each of the arms is coupled to at least one of the inside connectors. One of the pivot joint assemblies can include a ball joint coupling the mirror to the interconnection assembly. The inner and outer tubes and the sleeve of each of the pivot joint assemblies provide a lockable interconnection arm. In example embodiments, each of the lockable interconnection arms is orthogonal lengthwise in relation to each of the arms to which it is coupled. In example embodiments, the arms include an adjustable arm that is coupled to the base and telescopically repositionable in height, e.g., to a maximum height configuration at which a distance from the bottom of the base to the top of the adjustable arm is around 27 inches.

Although the present invention(s) has(have) been described in terms of the example embodiments above, numerous modifications and/or additions to the above-described embodiments would be readily apparent to one skilled in the art. It is intended that the scope of the present invention(s) extend to all such modifications and/or additions.

What is claimed is:

1. A viewing apparatus that is selectively securable to surfaces, the viewing apparatus comprising:
    a mirror;
    a base; and
    an interconnection assembly between the mirror and the base;
    wherein the base is configured to allow a user to selectively lock or unlock the viewing apparatus to/from a surface and includes a housing, a suction device supporting the housing, a lifter connected to the suction device, a lock/unlock selector supported by and rotatable in relation to the housing, and a coupler including guide surfaces, the coupler being operatively interconnected between interior surfaces of the selector and drive contacts of the lifter, the coupler repositioning with the selector as the selector is rotationally repositioned in relation to the housing, the guide surfaces raising or lowering the lifter and a central portion of the suction device in relation to the housing as the coupler is rotationally repositioned increasing or decreasing a volume of a space between an underside surface of the suction device and the surface depending upon a direction of rotation of the selector in relation to the housing to lock or unlock the viewing apparatus, respectively;
    wherein the coupler includes a generally cylindrical coupler main body and a pair of wings extending from opposite sides of the coupler main body.

2. The viewing apparatus of claim 1, wherein the interconnection assembly includes arms and pivot joints configured to facilitate repositionability of the arms in relation to each other.

3. The viewing apparatus of claim 1, wherein the suction device includes a flexible diaphragm and the lifter is secured within the central portion and adjacent to the flexible diaphragm.

4. The viewing apparatus of claim 3, wherein the selector, the coupler and the lifter are configured such that the lifter is raised upward in relation to the coupler and the housing as the coupler repositions driven by the selector, the lifter raising the central portion of the flexible diaphragm in relation to the housing increasing the volumetric size of the space between the bottom of the flexible diaphragm and the surface upon with the base is located thereby creating vacuum suction.

5. The viewing apparatus of claim 1, wherein the suction device includes a flexible suction interface portion, and the lifter includes a disc-shaped lower portion enclosed within the flexible suction interface portion.

6. The viewing apparatus of claim 1, wherein the housing includes, as structural portions extending through an interior portion of the base circumscribed by the lock/unlock selector, dual wing stops against which the wings are repositioned when the selector is moved to an unlock position of the selector.

7. The viewing apparatus of claim 1, wherein the lock/unlock selector is provided in the form of a rotatable ring having an exterior including raised surface portions configured to facilitate easier visual or tactile identification of the selector and gripability.

8. A viewing apparatus that is selectively securable to surfaces, the viewing apparatus comprising:
    a mirror;
    a base; and
    an interconnection assembly between the mirror and the base;
    wherein the base is configured to allow a user to selectively lock or unlock the viewing apparatus to/from a surface and includes a housing, a suction device supporting the housing, a lifter connected to the suction device, a lock/unlock selector supported by and rotatable in relation to the housing, and a coupler including guide surfaces, the coupler being operatively interconnected between interior surfaces of the selector and drive contacts of the lifter, the coupler repositioning with the selector as the selector is rotationally repositioned in relation to the housing, the guide surfaces raising or lowering the lifter and a central portion of the suction device in relation to the housing as the coupler is rotationally repositioned increasing or decreasing a volume of a space between an underside surface of the suction device and the surface depending upon a direction of rotation of the selector in relation to the housing to lock or unlock the viewing apparatus, respectively;
    wherein the coupler includes a pair of wings, and the selector includes two pairs of vertical fins at opposite sides of the selector, each pair defining a channel within which one of the wings is located.

9. A viewing apparatus that is selectively securable to surfaces, the viewing apparatus comprising:
    a mirror;
    a base; and
    an interconnection assembly between the mirror and the base;
    wherein the base is configured to allow a user to selectively lock or unlock the viewing apparatus to/from a surface and includes a housing, a suction device supporting the housing, a lifter connected to the suction device, a lock/unlock selector supported by and rotatable in relation to the housing, and a coupler including guide surfaces, the coupler being operatively interconnected between interior surfaces of the selector and drive contacts of the lifter, the coupler repositioning with the selector as the selector is rotationally repositioned in relation to the housing, the guide surfaces raising or lowering the lifter and a central portion of the suction device in relation to the housing as the coupler is rotationally repositioned increasing or decreasing a volume of a space between an underside surface of the suction device and the surface depending upon a direction of rotation of the selector in relation to the housing to lock or unlock the viewing apparatus, respectively;
    wherein the drive contacts of the lifter are provided in the form of upper and lower drive bars.

10. The viewing apparatus of claim 9, wherein the coupler includes a generally cylindrical coupler main body and a pair of wings extending from opposite sides of the coupler main body.

11. The viewing apparatus of claim 9, wherein the coupler includes ridges/transitions located along the guide surfaces and is configured such that movement of the coupler through or substantially through its full angular range of movement, defined and limited at opposite ends thereof by stops within the housing, advances the upper and lower drive bars sufficiently far around curved paths defined by the guide surfaces to move the drive bars past the ridges/transitions and into recesses of the coupler, after which suction created by so repositioning the drive bars locks the base to the surface.

12. The viewing apparatus of claim 9,
wherein the interconnection assembly is coupled or connected between the mirror and the base, the interconnection assembly including an adjustable arm and a height lock/unlock device, the adjustable arm including a pair of interfitting tubes which are interfitted and telescopically slidable in relation to each other when in an unlocked configuration of the adjustable arm, the pair of interfitting tubes including an inner tube and an outer tube coupled to the base, the lock/unlock device including a sleeve fitted about the inner tube and an extender secured to and within the upper end of the outer tube, the sleeve having a threaded and tapered interior portion that interfits with threaded and tapered exterior portions at and defined by slots along a distal end of the extender, the sleeve and the extender being configured such that the sleeve when repositioned toward the extender bears against and inwardly repositions extender portions at the distal end to frictionally engage with the inner tube preventing the inner tube and the outer tube from repositioning in relation to each other in a locked configuration of the adjustable arm.

13. The viewing apparatus of claim 12, wherein the inner tube fits within the extender, and is slidable in relation to the extender when the adjustable arm is unlocked.

14. The viewing apparatus of claim 12, wherein the extender is secured at an inside connector portion thereof to and within an opening at the upper end of the outer tube.

15. The viewing apparatus of claim 12, wherein the adjustable arm includes a bushing, which is secured to and within an opening at the lower end of the inner tube, the bushing including a periphery flange, ring or radial extension which serves as a catch in relation to a stop surface provided by an inside connector portion, thereby preventing the inner tube from being pulled out of engagement and a telescopic operational configuration with the outer tube.

16. A viewing apparatus that is selectively securable to surfaces, the viewing apparatus comprising:
a mirror;
a base; and
an interconnection assembly between the mirror and the base;
wherein the base is configured to allow a user to selectively lock or unlock the viewing apparatus to/from a surface and includes a housing, a suction device supporting the housing, a lifter connected to the suction device, a lock/unlock selector supported by and rotatable in relation to the housing, and a coupler including guide surfaces, the coupler being operatively interconnected between interior surfaces of the selector and drive contacts of the lifter, the coupler repositioning with the selector as the selector is rotationally repositioned in relation to the housing, the guide surfaces raising or lowering the lifter and a central portion of the suction device in relation to the housing as the coupler is rotationally repositioned increasing or decreasing a volume of a space between an underside surface of the suction device and the surface depending upon a direction of rotation of the selector in relation to the housing to lock or unlock the viewing apparatus, respectively;
wherein the housing includes lower latches that position adjacent to interior portions of the selector securing and facilitating rotational repositioning of the selector in relation to the housing.

17. A viewing apparatus that is selectively securable to surfaces, the viewing apparatus comprising:
a mirror;
a base; and
an interconnection assembly between the mirror and the base;
wherein the base is configured to allow a user to selectively lock or unlock the viewing apparatus to/from a surface and includes a housing, a suction device supporting the housing, a lifter connected to the suction device, a lock/unlock selector supported by and rotatable in relation to the housing, and a coupler including guide surfaces, the coupler being operatively interconnected between interior surfaces of the selector and drive contacts of the lifter, the coupler repositioning with the selector as the selector is rotationally repositioned in relation to the housing, the guide surfaces raising or lowering the lifter and a central portion of the suction device in relation to the housing as the coupler is rotationally repositioned increasing or decreasing a volume of a space between an underside surface of the suction device and the surface depending upon a direction of rotation of the selector in relation to the housing to lock or unlock the viewing apparatus, respectively;
wherein the housing includes a cap, positioned above the selector, and upper latches that locate and engage within inner wall recesses of the cap securing the cap to the housing and preventing rotational repositioning of the cap in relation to the housing.

18. The viewing apparatus of claim 17, wherein the housing includes a lower housing portion with an opening configured to receive and laterally support the lifter therein.

19. The viewing apparatus of claim 18, wherein the selector is supported between circumferential top periphery surfaces of the lower housing and circumferential bottom periphery surfaces of the cap.

20. A viewing apparatus that is selectively securable to surfaces, the viewing apparatus comprising:
a mirror;
a base; and
an interconnection assembly between the mirror and the base;
wherein the base is configured to allow a user to selectively lock or unlock the viewing apparatus to/from a surface and includes a housing, a suction device supporting the housing, a lifter connected to the suction device, a lock/unlock selector supported by and rotatable in relation to the housing, and a coupler including guide surfaces, the coupler being operatively interconnected between interior surfaces of the selector and drive contacts of the lifter, the coupler repositioning with the selector as the selector is rotationally repositioned in relation to the housing, the guide surfaces raising or lowering the lifter and a central portion of the suction device in relation to the housing as the coupler is rotationally repositioned increasing or decreasing a volume of a space between an underside surface of the suction device and the surface depending upon a direction of rotation of the selector in relation to the housing to lock or unlock the viewing apparatus, respectively;
wherein the lifter includes drive bar portions extending from opposite sides of the lifter, and wherein the coupler includes guide surfaces within a cylindrical main body of the coupler, the guide surfaces including ridges over which the drive bar portions are repositioned to detent into recesses of the coupler when the selector is moved to a lock position of the selector.

* * * * *